US011728922B2

(12) United States Patent
Ye et al.

(10) Patent No.: US 11,728,922 B2
(45) Date of Patent: Aug. 15, 2023

(54) METHOD AND APPARATUS FOR DETERMINATION OF UPLINK/DOWNLINK TRANSPORT BLOCK SIZE AND MODULATION AND CODING SCHEME

(71) Applicant: Samsung Electronics Co., Ltd., Suwon-si (KR)

(72) Inventors: Qiaoyang Ye, San Jose, CA (US); Jeongho Jeon, San Jose, CA (US); Joonyoung Cho, Portland, OR (US); Shuang Tian, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 17/131,499

(22) Filed: Dec. 22, 2020

(65) Prior Publication Data

US 2022/0029733 A1    Jan. 27, 2022

Related U.S. Application Data

(60) Provisional application No. 63/057,052, filed on Jul. 27, 2020, provisional application No. 63/057,067, filed on Jul. 27, 2020.

(51) Int. Cl.
*H04L 1/00* (2006.01)
*H04W 72/20* (2023.01)

(52) U.S. Cl.
CPC .............. *H04L 1/001* (2013.01); *H04W 72/20* (2023.01)

(58) Field of Classification Search
CPC ........................... H04W 72/0406; H04L 1/001
(Continued)

(56) References Cited

U.S. PATENT DOCUMENTS 9,407,417 B2   8/2016  Chen et al.
10,314,037 B2  6/2019  Chen et al.
(Continued)

FOREIGN PATENT DOCUMENTS

CN          110062474 A        7/2019
WO         2018009595 A1       1/2018
WO     WO-2019160737 A1 *    8/2019   ........... H04L 1/1835

OTHER PUBLICATIONS

International Search Report and Written Opinion of the International Searching Authority dated Nov. 2, 2021, in connection with International Application No. PCT/KR2021/009742, 8 pages.
(Continued)

*Primary Examiner* — Christopher M Crutchfield
*Assistant Examiner* — Jean F Voltaire

(57) ABSTRACT

A non-terrestrial network (NTN) node transmits configuration information including an indication of a maximum transmission block size (TBS) for a physical uplink shared channel (PUSCH) transmission or a physical downlink shared channel (PDSCH). A TBS for the PUSCH or PDSCH is determined based on at least the indicated TBS, and one of a signal indicates one of a maximum modulation and coding scheme (MCS) for the PUSCH or PDSCH transmission or whether the PUSCH or PDSCH transmission uses a default MCS, or the MCS is determined based on at least the indicated maximum MCS, and the PUSCH is transmitted or the PDSCH is received based on the determined TBS and the determined MCS. A maximum TBS, a maximum MCS, or a number of hybrid automatic repeat request (HARD) processes is indicated by a master information block (MIB), a system information block (SIB), or radio resource control (RRC) signaling.

20 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2005/0208973 | A1* | 9/2005 | Iochi ..................... | H04W 52/16 |
| | | | | 455/522 |
| 2014/0192732 | A1* | 7/2014 | Chen ..................... | H04L 1/0016 |
| | | | | 370/328 |
| 2015/0103752 | A1* | 4/2015 | Yu ........................ | H04L 49/9005 |
| | | | | 370/329 |
| 2017/0019913 | A1* | 1/2017 | Ahn ....................... | H04L 5/0055 |
| 2019/0007129 | A1* | 1/2019 | Vargas .................. | H04B 7/1858 |
| 2019/0068334 | A1* | 2/2019 | Stern-Berkowitz .......................... |
| | | | | H04L 1/1812 |
| 2020/0059906 | A1* | 2/2020 | Gupta ................... | H04L 5/0053 |
| 2020/0305177 | A1* | 9/2020 | Yasukawa ............. | H04L 1/1854 |
| 2020/0412443 | A1* | 12/2020 | Wang .................... | H04W 8/06 |
| 2021/0058823 | A1 | 2/2021 | Liu et al. | |

OTHER PUBLICATIONS

"3rd Generation Partnership Project; Technical Specification Group Radio Access Network; Study on New Radio (NR) to support non-terrestrial networks (Release 15)", 3GPP TR 38.811 V15.3.0, Jul. 2020, 126 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"Solutions for NR to support non-terrestrial networks (NTN)", 3GPP TSG RAN meeting #86, RP-193234, Sitges, Spain, Dec. 9-13, 2019, 10 pages.

"New Study WID on NB-IoT/eTMC support for NTN", 3GPP TSG RAN Meeting #86, RP-193235, Sitges, Spain, Dec. 9-31, 2019, 4 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; Physical layer procedures for data (3GPP TS 38.214 version 16.2.0 Release 16)", ETSI TS 138 214 V16.2.0, Jul. 2020, 167 pages.

\* cited by examiner

METHOD AND APPARATUS FOR DETERMINATION OF UPLINK/DOWNLINK TRANSPORT BLOCK SIZE AND MODULATION AND CODING SCHEME

CROSS-REFERENCE TO RELATED APPLICATION AND CLAIM OF PRIORITY

This application claims priority under 35 U.S.C. § 119(e) to U.S. Provisional Patent Application No. 63/057,052 filed Jul. 27, 2020 and U.S. Provisional Patent Application No. 63/057,067 filed Jul. 27, 2020. The above-identified patent documents are incorporated herein by reference.

TECHNICAL FIELD

The present disclosure relates generally to wireless communication with large propagation delay, and more specifically, to UL/DL TBS and MCS determination, with optional joint consideration of HARQ operations for systems with large propagation delay between a BS and UEs.

BACKGROUND

To meet the demand for wireless data traffic having increased since deployment of $4^{th}$ Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Embodiments relate to electronic devices and methods on UL/DL TBS and MCS determination, with option to jointly consider HARQ operations for systems with large propagation delay between BS and UEs.

A non-terrestrial network (NTN) node transmits configuration information including an indication of a maximum transmission block size (TBS) for a physical uplink shared channel (PUSCH) transmission or a physical downlink shared channel (PDSCH). A TBS for the PUSCH or PDSCH is determined based on at least the indicated TBS, and one of a signal indicates one of a maximum modulation and coding scheme (MCS) for the PUSCH or PDSCH transmission or whether the PUSCH or PDSCH transmission uses a default MCS, or the MCS is determined based on at least the indicated maximum MCS, and the PUSCH is transmitted or the PDSCH is received based on the determined TBS and the determined MCS. A maximum TBS, a maximum MCS, or a number of hybrid automatic repeat request (HARQ) processes is indicated by a master information block (MIB), a system information block (SIB), or radio resource control (RRC) signaling.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
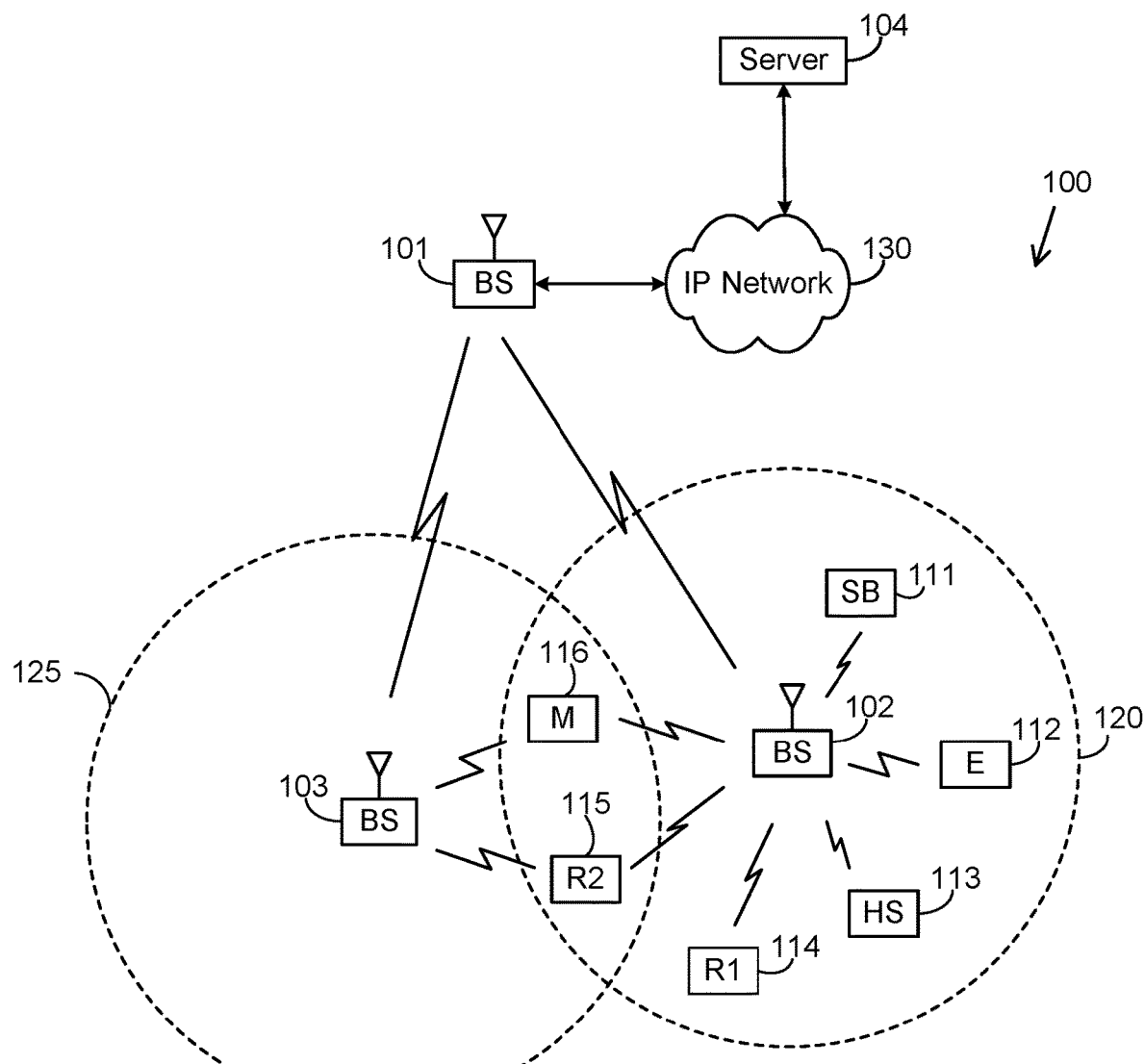
FIG. 1 illustrates an exemplary networked system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[38.811] 3GPP, TR 38.811, Study on NR to support non-terrestrial networks.
[38.821] 3GPP, TR 38.821, Solutions for NR to support non-terrestrial networks (NTN).
[RP-193234] RP-193234, Solutions for NR to support non-terrestrial networks (NTN), Thales, RAN #86, December 2019.
[RP-193235] RP-193235, New study WID on NB-IoT/eMTC support for NTN, MediaTek Inc., RAN #86, December 2019.
[38.331] 3GPP, TS 38.331, 5G; NR; Radio Resource Control (RRC); Protocol specification.
[38.214] 3GPP, TS 38.214, 5G; NR; Physical layer procedures for data.

The above-identified references are incorporated herein by reference.

Abbreviations

THz Terahertz
NTN non-terrestrial networks
BS base station
UE user equipment
NR New Radio
3GPP 3rd Generation Partnership Project
WI Work Item
SI Study Item
LEO low earth orbiting
MEO medium earth orbiting
GEO geostationary earth orbiting
TBS transport block size
MCS modulation and coding scheme
SIB system information block
DCI downlink control information
PDCCH physical downlink control channel
PDSCH physical downlink shared channel
PUSCH physical uplink shared channel
RRC radio resource control
MSB most significant bits
LSB least significant bits DL downlink
UL uplink
IoT Internet of things
eMTC enhanced machine type communication
Non-Terrestrial Network (NTN)

NTN refers to the networks, or segments of networks, using an airborne or space-borne vehicle to embark a transmission equipment relay node or base station [38.811]. NTN can provide ubiquitous coverage and is less vulnerable to disasters, compared to conventional terrestrial network equipment. There is increasing interest in support of NTN in LTE and 5G systems. 3GPP has completed a study in Rel-15 on NTN deployment scenarios, channel models and potential impact areas on NR to support NTN [38.811]. Based on the outcomes of the resulting Technical Report [38.811], 3GPP further conducted study in Rel-16 on a set of necessary features/adaptations to support NTN in NR [38.821]. In Rel-17, a WI for NTN in NR [RP-193234] and a SI for NB-IoT/eMTC support for NTN [RP-193235] have been approved.

As studied in [38.821], due to the large distance between the satellites and UEs, the link budget may be more limited in NTN systems as compared to conventional terrestrial networks. The determination of TBS and MCS in an NTN system should take into account the limited link budget.

In addition, the long propagation delay between a BS and UEs in NTN scenarios results in impact on hybrid automatic repeat request (HARQ) operation as discussed in [38.821]. Two options for the HARQ enhancements are provided by [38.821]:

Option 1: Keep 16 HARQ process identifiers (IDs) and rely on radio link control (RLC) automatic repeat request (ARQ) for HARQ processes with UL HARQ feedback disabled via radio resource control (RRC).

Option 2: Use greater than 16 HARQ process IDs with UL HARQ feedback enabled via RRC.

Thus, a HARQ operation applicable to cases with large round-trip delay should be designed for NTN systems.

In summary, for systems such as NTN, there is large distance and thus high propagation loss between the BS and UEs, and thus the link budget is limited. Methods that are able to handle the limited link budget should be designed. In addition, the long propagation delay between BS and UEs in systems such as NTN impacts the HARQ operation. Methods for HARQ operation supporting long propagation delay should be designed.

Techniques, apparatuses and methods are disclosed for determination of TBS and MCS and for HARQ operation methods for UL transmissions, that support scenarios with limited link budget and/or large propagation delay. Specifically, the maximum supported TBS and MCS for UL transmissions can be limited, and can be jointly configured with UL HARQ operations such as larger number of HARQ processes than a predefined value (e.g. more than supported number of HARQ processes in NR systems).

Techniques, apparatuses and methods are disclosed for determination of TBS and MCS and for HARQ operation methods for DL transmissions, that support scenarios with limited link budget and/or large propagation delay. Specifically, the maximum supported TBS and MCS for DL transmissions can be limited, and can be jointly configured with DL HARQ operations without or with limited impact on UE soft buffer size.

The disclosed designs can be applied not only to NTN systems, but also to any other wireless communication systems. The examples for NTN systems should be considered in an inclusive manner, without exclusion of other wireless communication systems.

FIG. 1 illustrates an exemplary networked system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
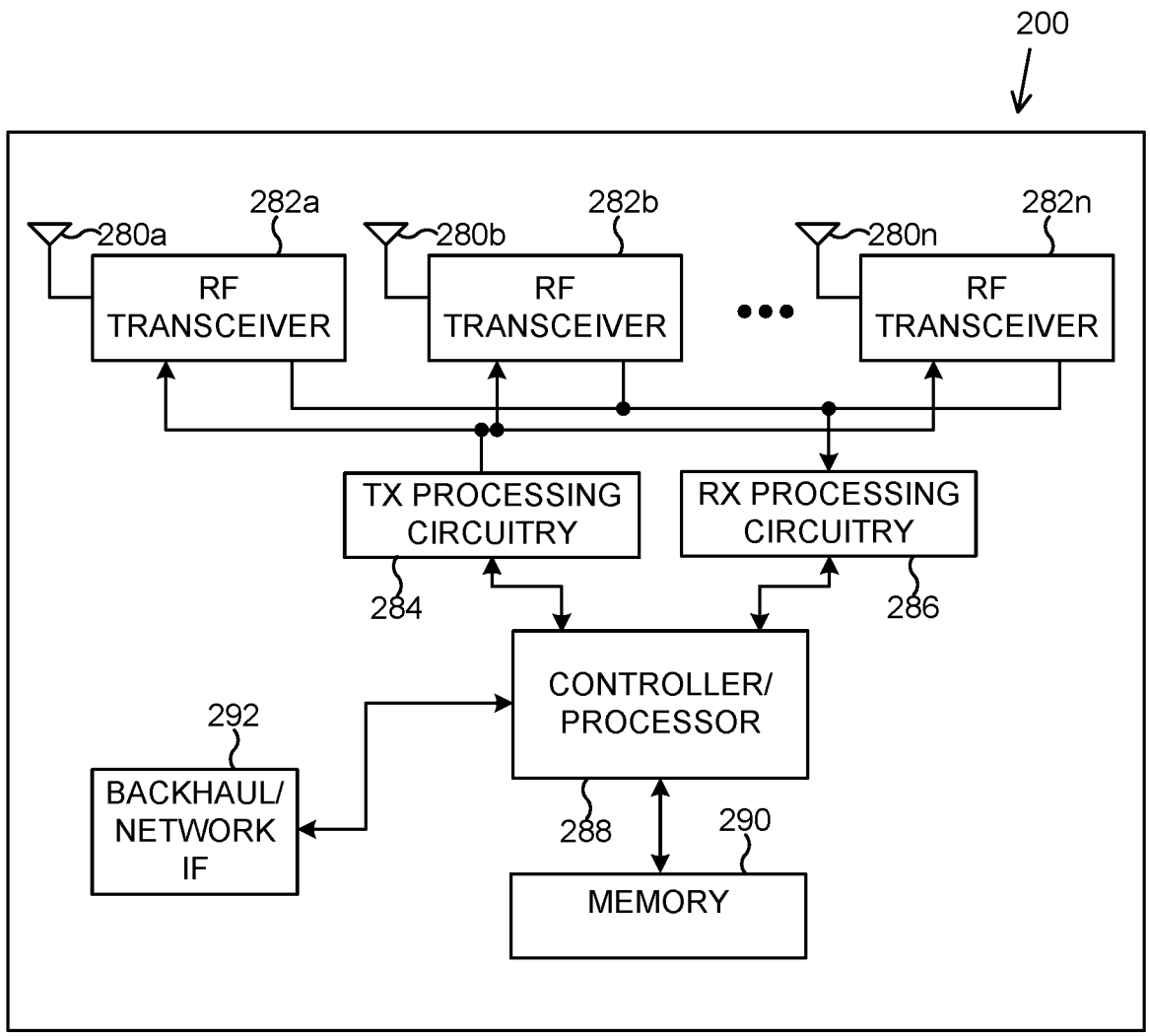
FIG. 2 illustrates an exemplary base station (BS) according to various embodiments of this disclosure.

FIG. 2 illustrates an exemplary base station (BS) according to various embodiments of this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 280a-280n, multiple radio frequency (RF) transceivers 282a-282n, transmit (TX or Tx) processing circuitry 284, and receive (RX or Rx) processing circuitry 286. The BS 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 102 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 102 to communicate with other devices or systems over a backhaul connection or over a network. The interface 292 could support communications over any suitable wired or wireless connection(s). For example, when the BS 102 is implemented as part of a cellular communication system (such as one supporting 6G, 5G, LTE, or LTE-A), the interface 292 could allow the BS 102 to communicate with other BSs over a wired or wireless backhaul connection. When the BS 102 is implemented as an access point, the interface 292 could allow the BS 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 102, various changes may be made to FIG. 2. For example, the BS 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
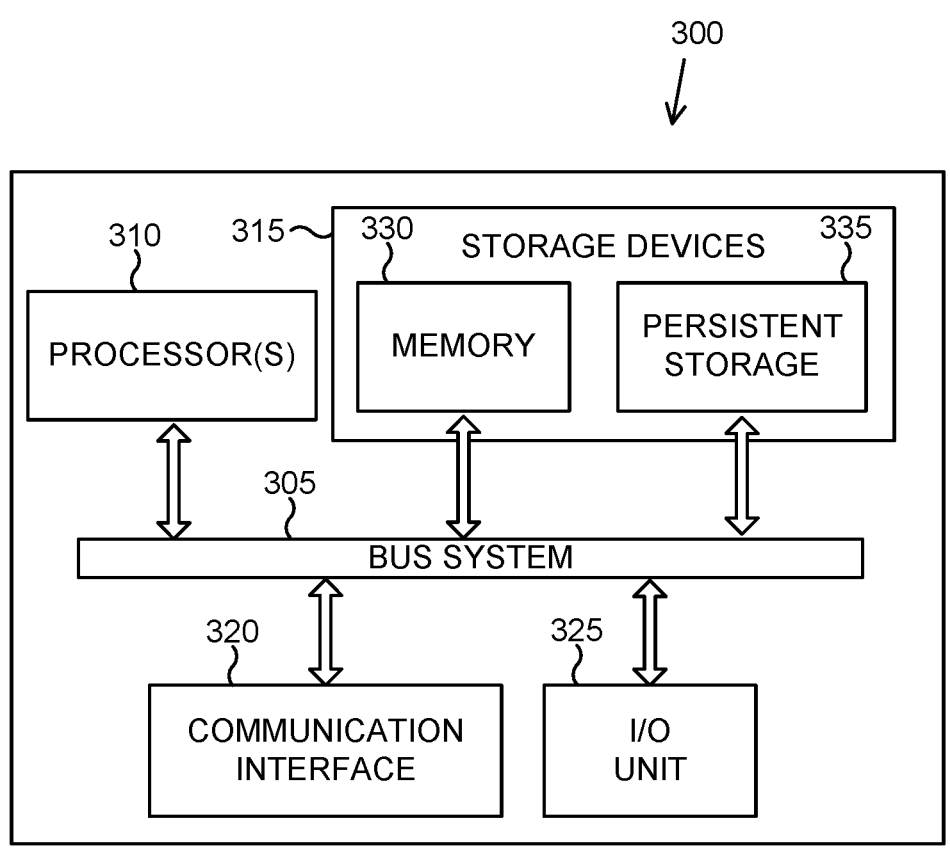
FIG. 3 illustrates an exemplary electronic device for communicating in the networked computing system according to various embodiments of this disclosure.

FIG. 3 illustrates an exemplary electronic device for communicating in the networked computing system according to various embodiments of this disclosure. In one embodiment, the electronic device 300 is a user equipment implemented as a mobile device, which can represent one of the UEs in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the electronic device 300 can serve as a shared spectrum manager in a networked computing system can generate synchronization source/slave assignments and configure synchronization signals.

Although FIG. 3 illustrates an example of an electronic device 300 in a wireless system including a plurality of base stations, such as base stations 101, 102, and 103 in FIG. 1, various changes may be made to FIG. 3. For example, various components in FIG. 3 can be combined, further subdivided, or omitted and additional components could be added according to particular needs. In addition, as with computing and communication networks, servers can come in a wide variety of configurations, and FIG. 3 does not limit this disclosure to any particular electronic device.

Indication Method for TBS and/or Number of HARQ Processes

As discussed above, the link budget can be limited in some systems such as NTN scenarios, and the link quality may not be sufficient to support the transmission of a large TBS. The maximum TBS supported for NTN systems can be configured to be within certain range.

Figure 4:
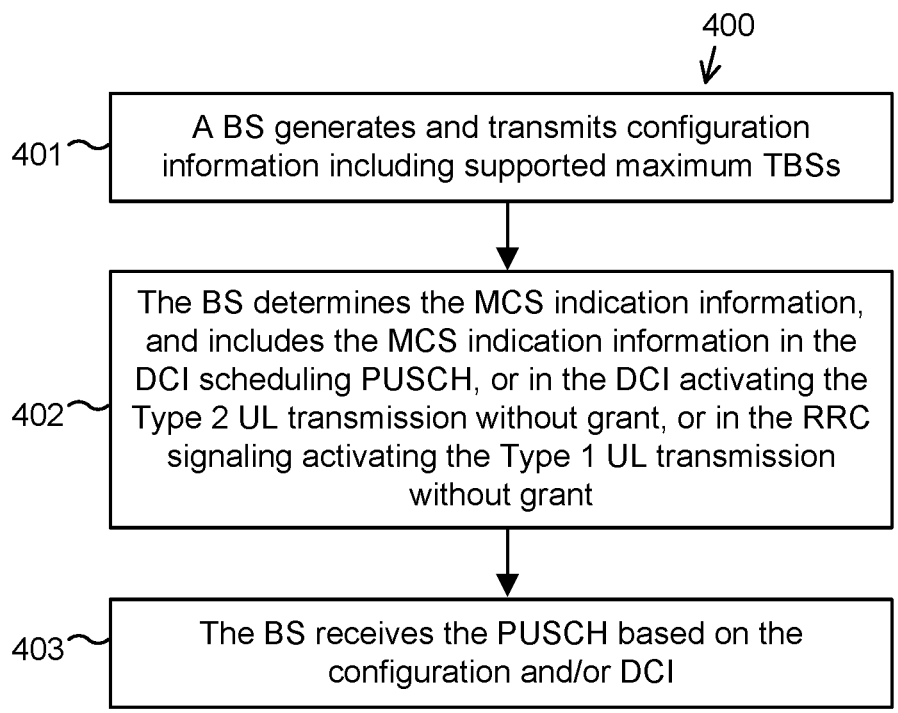
FIG. 4 illustrates a flowchart for an example of TBS indication for scheduling and reception of PUSCH according to embodiments of the present disclosure'

FIG. 4 illustrates a flowchart for an example of TBS indication for scheduling and reception of PUSCH according to embodiments of the present disclosure. The method 400 depicted in FIG. 4 is for illustration only. Other embodiments could be used without departing from the scope of this disclosure.

At operation 401, a BS generates and transmits configuration information including the indication of a maximum TBS for PUSCH, and/or an indication of a number of HARQ processes for UL, where the indications can be explicit or implicit, and can be cell-specific or UE-specific. As one example, the indications of maximum TBS and the number of HARQ processes can be associated. For example, the maximum TBS can be explicitly indicated, while the number of HARQ processes can be implicitly indicated based on the indicated maximum TBS, or vice versa. Alternatively, the indication of maximum TBS and the number of HARQ processes can be independent. At operation 402, the BS determines the MCS indication information and carries the MCS indication information in the DCI scheduling the PUSCH, or in the DCI activating the Type 2 UL transmission without grant, or in the RRC signaling activating the Type 1 UL transmission without grant. At operation 403, the BS receives the PUSCH based on the configuration and/or the DCI.

Figure 5:
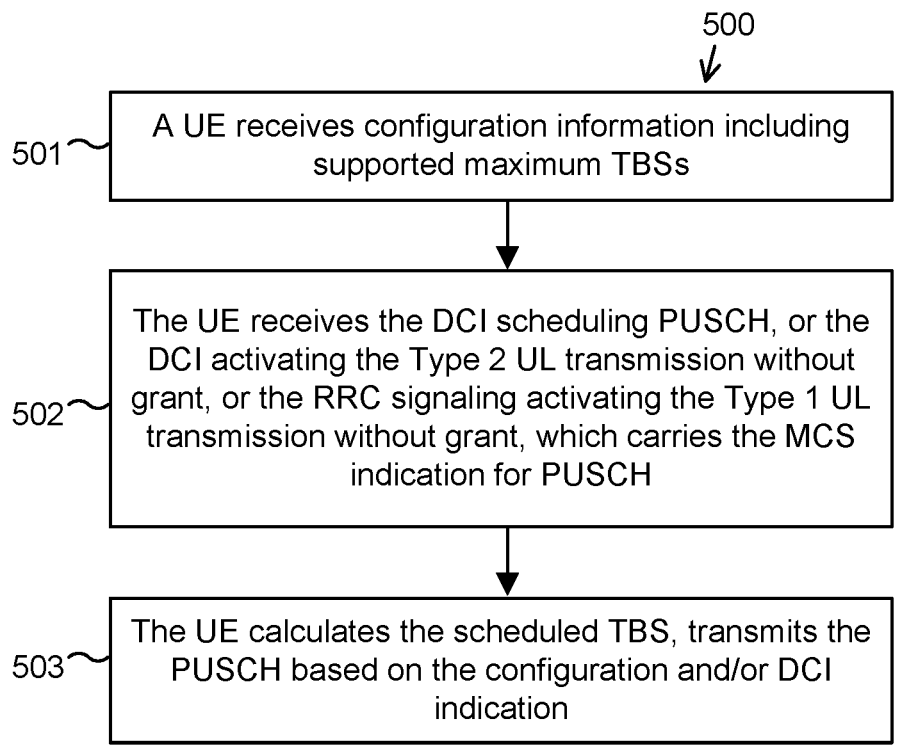
FIG. 5 illustrates a flowchart for an example of TBS determination for transmission of PUSCH according to embodiments of the present disclosure.

FIG. 5 illustrates a flowchart for an example of TBS determination for transmission of PUSCH according to embodiments of the present disclosure. The method 500 depicted in FIG. 5 is for illustration only. Other embodiments could be used without departing from the scope of this disclosure.

At operation 501, a UE receives the configuration information including the indication of the maximum TBS for PUSCH, and/or an indication of a number of HARQ processes for UL, where the indication can be explicit or implicit, and can be cell-specific or UE-specific. As one example, the indications of maximum TBS and the number of HARQ processes can be associated, as discussed above. Alternatively, the indication of maximum TBS and number of HARQ processes can be independent. At operation 502, the UE receives the DCI carrying the HARQ process number and an MCS indication for PUSCH scheduling, or the DCI carrying the MCS indication for activation of Type 2 UL transmission without grant, or the RRC signaling carrying the MCS indication for activation of Type 1 UL transmission without grant. At operation 503, the UE calculates the scheduled TBS based on the maximum TBS configuration and the MCS indication in DCI or RRC signaling, and transmits the PUSCH based on the configuration and/or DCI indication, considering the calculated the TBS value. For example, denoting the TBS indicated by the MCS index in DCI or RRC signaling by TBS', and the maximum configured TBS by $TBS_{max}$, the determined TBS can be $$\min(TBS', TBS_{max}).$$

In one embodiment of operations 401 and 501, the indication of maximum TBS for PDSCH and PUSCH can be associated. For example, a mapping between maximum TBS for PDSCH and maximum TBS for PUSCH can be predefined, e.g., the maximum TBS for PDSCH is defined to be the same as the configured maximum TBS for PUSCH. Alternatively, the configuration of maximum TBS for PDSCH and PUSCH can be independent.

Explicit Indication of Maximum TBS for PUSCH

The indication method of maximum TBS for PUSCH can be explicit. For example, the maximum TBS configuration can be cell-specific, and can be configured by system information, e.g., master information block (MIB), system information block 1 (SIB1), other system information blocks (SIBs), and/or a new SIB introduced for NTN systems. An example of using SIB1 for the explicit indication is as follows, where the information elements (IEs) BWP-UplinkCommon, UplinkConfigCommonSIB, or servingCellConfigCommonSIB in SIB1 can be modified. In the example Abstract Syntax Notation One (ASN.1) in TABLE 1, the IE PUSCH-ConfigCommon in the IE BWP-UplinkCommon is modified to include maxTBSPUSCH:

TABLE 1

An example of IE PUSCH-ConfigCommon modification for indication of max TBS

| PUSCH-ConfigCommon ::= | SEQUENCE { |
|---|---|
| groupHoppingEnabledTransformPrecoding OPTIONAL, -- Need R | ENUMERATED {enabled} |
| pusch-TimeDomainAllocationList | PUSCH-TimeDomainResourceAllocationList |

TABLE 1-continued

An example of IE PUSCH-ConfigCommon modification for indication of max TBS

| | | |
|---|---|---|
| OPTIONAL, -- Need R | | |
| msg3-DeltaPreamble | INTEGER (−1..6) | |
| OPTIONAL, -- Need R | | |
| p0-NominalWithGrant | INTEGER (−202..24) | |
| OPTIONAL, -- Need R | | |
| maxTBSPUSCH | ENUMERATED {N1, N2, .., NK} | |
| OPTIONAL, -- Cond NTN | | |
| ... | | |
| } | | |

The parameters N1, N2, . . . , NK can be any integers, and the condition tag 'Cond NTN' refers to the NTN cases. The condition tag 'Cond NTN' throughout this disclosure is given as an example, and should be considered in an inclusive manner. For systems other than NTN, the condition tag can be changed accordingly.

In the subject example, different maximum TBSs for PDSCH and PUSCH can be configured, while in some other examples the maximum TBS for PDSCH and PUSCH can be jointly configured, e.g., sharing the same value and being indicated in the IE servingCellConfigCommonSIB.

An example of introducing a new SIB for the indication of maximum TBS is given by the ASN.1 in TABLE 2 below, e.g., SIB15 can be introduced:

TABLE 2

An example of IE SIB15 modification for indication of max TBS

| | |
|---|---|
| SIB15-r17 ::= | SEQUENCE { |
| maxTBSPUSCH OPTIONAL | ENUMERATED {N1, N2, .., NK} |
| maxTBSPUSCH OPTIONAL | ENUMERATED {M1, M2, .., ML} |
| ... | |
| } | |

The parameters N1, N2, . . . , NK, and M1, M2, . . . , ML can be any integers. In the given example, different maximum TBS for PDSCH and PUSCH can be configured, while in some other examples the maximum TBS for PDSCH and PUSCH can be jointly configured, e.g. sharing the same value.

As another example of explicit indication, the maximum TBS configuration can be UE-specific, and can be configured by UE-specific RRC signaling. An example of the configuration can be as indicated by the ASN.1 in TABLE 3 below, where the IE PUSCH-ServingCellConfig is modified;

TABLE 3

An example of IE PUSCH-ServingCellConfig modification for indication of max TBS

| | |
|---|---|
| PUSCH-ServingCellConfig ::= | SEQUENCE { |
| codeBlockGroupTransmission { PUSCH-CodeBlockGroupTransmission } OPTIONAL, -- Need M | SetupRelease |
| rateMatching {limitedBufferRM} OPTIONAL, -- Need S | ENUMERATED |
| xOverhead {xoh6, xoh12, xoh18} OPTIONAL, -- Need S | ENUMERATED |
| ..., | |
| [[ | |
| maxMIMO-Layers | INTEGER (1..4) |

TABLE 3-continued

An example of IE PUSCH-ServingCellConfig modification for indication of max TBS

| | |
|---|---|
| OPTIONAL, -- Need M | |
| processingType2Enabled | BOOLEAN |
| OPTIONAL -- Need M | |
| ]], | |
| [[ | |
| maxMIMO-LayersForDCI-Format0-2-r16 | INTEGER (1..4) |
| OPTIONAL -- Need M | |
| ]] | |
| maxTBSPUSCH {N1, N2, ..., NK} | ENUMERATED |
| OPTIONAL, -- Cond NTN | |
| } | |

In the above example, the same maximum TBS is applied to all UE's BWPs of one serving cell. Alternatively, the maximum TBS for PUSCH can be configured as UE-specific value of a BWP, via the IE PUSCH-Config in the IE BWP-UplinkDedicated as in the ASN.1 of TABLE 4:

TABLE 4

An example of IE PUSCH-Config modification for indication of max TBS

| | |
|---|---|
| PUSCH-Config ::= | SEQUENCE { |
| dataScramblingIdentityPUSCH OPTIONAL, -- Need S | INTEGER (0..1023) |
| txConfig {codebook, nonCodebook} OPTIONAL, -- Need S | ENUMERATED |
| dmrs-UplinkForPUSCH-MappingTypeA { DMRS-UplinkConfig } OPTIONAL, -- Need M | SetupRelease |
| dmrs-UplinkForPUSCH-MappingTypeB { DMRS-UplinkConfig } OPTIONAL, -- Need M | SetupRelease |
| ... | |
| ul-FullPowerTransmission-r16 {fullpower, fullpowerMode1, fullpoweMode2} OPTIONAL -- Need R | ENUMERATED |
| ]] | |
| maxTBSPUSCH {N1, N2, ..., NK} | ENUMERATED |
| OPTIONAL, -- Cond NTN | |
| } | |

In some examples, the increased number of HARQ processes can be jointly configured with the TBS reduction feature. As one example of the above embodiment with explicit indication of maximum TBS, the number of HARQ processes can be implicitly indicated based on configured maximum TBS. Denoting the maximum TBS supported in a system (e.g., in current NR system) or a predefined TBS value by $TBS_{cur}$ and the maximum TBS configured for the system by $TBS_{max}$, the number of HARQ processes in the system can be any integer or power of two that is no more than $$\frac{N \times TBS_{max}}{TBS_{max}},$$

where N is a predefined value (e.g., N=16).

In one embodiment, the above configuration methods can be applied to both the dynamically scheduled PUSCH, and UL transmission without dynamic grant (e.g., Type 1 or Type 2). In one example of this embodiment, the same maximum TBS value is applied to both of the dynamically scheduled PUSCH and UL transmissions without dynamic grant. In another example of this embodiment, different values of the maximum TBS can be configured for the dynamically scheduled PUSCH transmission without dynamic grant and the dynamically scheduled UL transmission without dynamic grant. In this example, two parameters would be indicated in the above configuration methods, e.g., "cg-maxTBSPUSCH," can be added to the above-mentioned IEs to indicated the maximum TBS for UL transmission without dynamic grant, while the parameter given in the above IEs, e.g., "maxTBSPUSCH," can indicate the maximum TBS for the dynamically scheduled PUSCH. The name of these parameters are just examples, and should be considered in an inclusive manner (that is, other names can also be used). Alternatively, the above methods are applied to the dynamically scheduled PUSCH only, while the following methods for configuration of the maximum TBS can be applied to the UL transmission without dynamic grant. The maximum TBS for UL transmission without dynamic grant can be explicitly indicated in UE-specific RRC signaling, e.g., in the IE ConfiguredGrantConfig. The parameters N1, N2, . . . , NK can be any integers. In one example, the configuration of the maximum TBS for UL transmission without dynamic grant, e.g., the parameter "cg-maxTBSPUSCH" in the IE within the ASN.t of TABLE 5 below, can be applied to both Type 1 and Type 2 UL transmissions without dynamic grant. Alternatively, different configurations of the maximum TBS can be applied to Type 1 and Type 2 UL transmissions without dynamic grant. For example, the parameter "cg-maxTBSPUSCH" in the IE below may be applied to Type 2 UL transmissions without dynamic grant, while another parameter "cg1-maxTBSPUSCH" can be introduced to the IE ConfiguredGrantConfig for indication of the maximum TBS for Type 1 UL transmissions without dynamic grant.

TABLE 5

An example of IE ConfiguredGrantConfig modification for indication of max TBS

| | |
|---|---|
| ConfiguredGrantConfig ::= | SEQUENCE { |
| frequencyHopping | ENUMERATED {intraSlot, |
| interSlot} | |
| OPTIONAL, -- Need S | |
| cg-DMRS-Configuration | DMRS-UplinkConfig, |
| mcs-Table | ENUMERATED {qam256, |
| qam64LowSE} | |
| OPTIONAL, -- Need S | |
| mcs-TableTransformPrecoder | ENUMERATED {qam256, |
| qam64LowSE} | |
| OPTIONAL, -- Need S | |
| uci-OnPUSCH | SetupRelease { CG-UCI-OnPUSCH |
| } | |
| OPTIONAL, -- Need M | |
| resourceAllocation | ENUMERATED { |
| resourceAllocationType0, resourceAllocationType1, | |
| dynamicSwitch }, | |
| rbg-Size | ENUMERATED {config2} |
| OPTIONAL, -- Need S | |
| powerControlLoopToUse | ENUMERATED {n0, n1}, |
| p0-PUSCH-Alpha | P0-PUSCH-AlphaSetId, |
| transformPrecoder | ENUMERATED {enabled, |
| disabled} | |
| OPTIONAL, -- Need S | |
| nrofHARQ-Processes | INTEGER(1..16), |
| repK | ENUMERATED {n1, n2, n4, n8}, |
| repK-RV | ENUMERATED {s1-0231, s2-0303, |
| s3-0000} | |
| OPTIONAL, -- Need R | |
| Periodicity | ENUMERATED { sym2, sym7, |
| sym1x14, sym2x14, sym4x14, sym5x14, sym8x14, sym10x14, | |
| sym16x14, sym20x14, sym32x14, sym40x14, sym64x14, sym80x14, | |
| sym128x14, sym160x14, sym256x14, sym320x14, sym512x14, | |
| sym640x14, sym1024x14, sym1280x14, sym2560x14, sym5120x14, | |
| sym6, sym1x12, sym2x12, sym4x12, sym5x12, sym8x12, | |
| sym10x12, sym16x12, sym20x12, sym32x12, sym40x12, sym64x12, | |
| sym80x12, sym128x12, sym160x12, sym256x12, sym320x12, | |
| sym512x12, sym640x12, sym1280x12, sym2560x12 }, | |
| configuredGrantTimer | INTEGER (1..64) |
| OPTIONAL, -- Need R | |
| rrc-ConfiguredUplinkGrant | SEQUENCE { |
| timeDomainOffset | INTEGER (0..5119), |
| timeDomainAllocation | INTEGER  (0..15), |
| frequencyDomainAllocation | BIT STRING (SIZE(18)), |
| antennaPort | INTEGER (0..31), |
| dmrs-SeqInitialization | INTEGER (0..1) |

TABLE 5-continued

An example of IE ConfiguredGrantConfig
modification for indication of max TBS

```
OPTIONAL,   -- Need R
    precodingAndNumberOfLayers          INTEGER (0..63),
    srs-ResourceIndicator               INTEGER (0..15)
OPTIONAL,   -- Need R
    mcsAndTBS                           INTEGER (0..31),
    frequencyHoppingOffset              INTEGER (1..
        maxNrofPhysicalResourceBlocks-1)
OPTIONAL,   -- Need R
    pathlossReferenceIndex              INTEGER (0..maxNrofPUSCH-
        PathlossReferenceRSs-1),
    ...,
    [[
    pusch-RepTypeIndicator-r16          ENUMERATED {pusch-
        RepTypeA,pusch-RepTypeB}
OPTIONAL,   -- Need M
    frequencyHoppingPUSCH-RepTypeB-r16  ENUMERATED
        {interRepetition, interSlot}
OPTIONAL,   -- Cond RepTypeB
    timeReferenceSFN-r16                ENUMERATED {sfn512}
OPTIONAL   -- Need R
    ]]
}
OPTIONAL,   -- Need R
    ...,
    [[
    cg-RetransmissionTimer-r16          INTEGER (1..64)
OPTIONAL,   -- Need R
    cg-minDFI-Delay-r16                 INTEGER (1..ffsValue)
OPTIONAL,   -- Need R Upper limit 7 FFS
    cg-nrofPUSCH-InSlot-r16             INTEGER (1..ffsValue)
OPTIONAL,   -- Need R
    cg-nrofSlots-r16                    INTEGER (1..ffsValue)
OPTIONAL,   -- Need R
    cg-StartingFullBW-InsideCOT-r16     ENUMERATED {ffs}
OPTIONAL,   -- Need R
    cg-StartingFullBW-OutsideCOT-r16    ENUMERATED {ffs}
OPTIONAL,   -- Need R
    cg-StartingPartialBW-InsideCOT-r16    ENUMERATED {ffs}
OPTIONAL,   -- Need R
    cg-StartingPartialBW-OutsideCOT-r16   ENUMERATED {ffs}
OPTIONAL,   -- Need R
    cg-UCI-Multiplexing                 ENUMERATED {enabled}
OPTIONAL,   -- Need R
    cg-COT-SharingOffset-r16            INTEGER (1..ffsValue)
OPTIONAL,   -- Need R
    betaOffsetCG-UCI-r16                INTEGER (1..ffsValue)
OPTIONAL,   -- Need R
    cg-COT-SharingList-r16              SEQUENCE (SIZE (1..ffsValue))
        OF CG-COT-Sharing-r16   OPTIONAL,  -- Need R
    harq-ProcID-Offset-r16              INTEGER (0..15)
OPTIONAL,   -- Need M
    harq-ProcID-Offset2-r16             INTEGER (0..15)
OPTIONAL,   -- Need M
    configuredGrantConfigIndex-r16
        ConfiguredGrantConfigIndex-r16
OPTIONAL,   -- Need M
    configuredGrantConfigIndexMAC-r16
        ConfiguredGrantConfigIndexMAC-r16
OPTIONAL,   -- Need M
    periodicityExt-r16                  INTEGER (1..5120)
OPTIONAL,   -- Need M
    startingFromRV0-r16                 ENUMERATED {on, off}
OPTIONAL,   -- Need M
    phy-PriorityIndex-r16               ENUMERATED {p0, p1}
OPTIONAL,    -- Need M
    autonomousReTx-r16                  ENUMERATED {enabled}
OPTIONAL   -- Cond LCH-BasedPrioritization
    ]]
    cg-maxTBSPUSCH                      ENUMERATED {N1, N2, .., NK}
OPTIONAL,   -- Cond NTN
}
```

Implicit Indication of Maximum TBS for PUSCH

As another embodiment of operations 401 and 501, the indication of maximum TBS for PUSCH can be implicit. As one example, a mapping between the maximum TBS for PUSCH and the system scenarios/modes can be predefined. Once the system scenario/mode is indicated, the maximum TBS for PUSCH can be determined accordingly, e.g., $TBS_{max-N}$ for system scenario/mode N, where N is an index such as 1, 2, etc. In one example, the number of HARQ processes can be configured similarly, a mapping between the number of HARQ processes and the system scenarios/modes can be predefined. Once the system scenario/mode is indicated, the number of HARQ processes can be determined accordingly, e.g., $X_N$ for system scenario/mode N. As one example of this embodiment, the configuration of system scenario/mode can be cell-specific, and can be configured by system information, e.g., via the MIB, SIB1, other SIBs and/or a new SIB introduced for the systems. For example, 1 reserved bit in the MIB can be used to indicate two scenarios/modes. Another example of using SIB1 for this indication is illustrated by the ASN.1 with TABLE 6 below, where the parameter N can be any integer. The parameter in the example below uses "NTNmode" as an example for NTN systems, while other names can be used for other systems. In one example, the mapping between the maximum TBS and the system scenarios/modes can be the same for the dynamically scheduled PUSCH and UL transmission without grant. Alternatively, different mappings between the maximum TBS and the system scenarios/modes can be predefined for the dynamically scheduled PUSCH and UL transmission without grant. For example, this example can be applied for configuration of maximum TBS for dynamically scheduled PUSCH, while the maximum TBS for UL transmission without grant can be configured separately, or vice versa.

TABLE 6

An example of IE SIB1 modification for indication of the system scenario/mode

```
SIB1 ::=                            SEQUENCE {
    cellSelectionInfo                   SEQUENCE {
        q-RxLevMin                          Q-RxLevMin,
        q-RxLevMinOffset                    INTEGER (1..8)
OPTIONAL,      -- Need S
        q-RxLevMinSUL                       Q-RxLevMin
OPTIONAL,      -- Need R
        q-QualMin                           Q-QualMin
OPTIONAL,      -- Need S
        q-QualMinOffset                     INTEGER (1..8)
OPTIONAL       -- Need S
    }
OPTIONAL,      -- Cond Standalone
    cellAccessRelatedInfo               CellAccessRelatedInfo,
    connEstFailureControl               ConnEstFailureControl
OPTIONAL,      -- Need R
    si-SchedulingInfo                   SI-SchedulingInfo
OPTIONAL,      -- Need R
    servingCellConfigCommon             ServingCellConfigCommonSIB
OPTIONAL,      -- Need R
    ims-EmergencySupport                ENUMERATED {true}
OPTIONAL,      -- Need R
    eCallOverIMS-Support                ENUMERATED {true}
OPTIONAL,      -- Cond Absent
    ue-TimersAndConstants               UE-TimersAndConstants
OPTIONAL,      -- Need R
    uac-BarringInfo                     SEQUENCE {
        uac-BarringForCommon                UAC-BarringPerCatList
OPTIONAL,      -- Need S
        uac-BarringPerPLMN-List             UAC-BarringPerPLMN-List
OPTIONAL,      -- Need S
        uac-BarringInfoSetList              UAC-BarringInfoSetList,
        uac-AccessCategory1-SelectionAssistanceInfo CHOICE {0
            plmnCommon                      UAC-AccessCategory1-
                SelectionAssistanceInfo,
            individualPLMNList              SEQUENCE (SIZE (2..maxPLMN))
                OF UAC-AccessCategory1-SelectionAssistanceInfo
        }
OPTIONAL       -- Need S
    }
OPTIONAL,      -- Need R
    useFullResumeID                     ENUMERATED {true}
OPTIONAL,      -- Need R
    lateNonCriticalExtension            OCTET STRING
OPTIONAL,
    nonCriticalExtension                SIB1-v16xy-IEs
OPTIONAL
    NTNmode                             INTEGER {1..N}
OPTIONAL,      -- Need S
}
```

In another example, the maximum TBS for PUSCH can be implicitly indicated based on a configured maximum amount of frequency resources that can be allocated for PUSCH, e.g., the maximum number of PRBs that can be allocated. Then the maximum TBS can be calculated based on predefined equations, e.g., based on the TBS determination in Section 6.1.4.2 in [38.214]. In examples where HARQ enhancement is jointly configured with a TBS reduction feature, the number of HARQ processes can be implicitly indicated based on the configured maximum TBS. Denoting the maximum TBS supported in a system (e.g., in current NR system) or a predefined TBS value by $TBS_{CUR}$ and the maximum TBS configured for the system by $TBS_{MAX}$, the number of HARQ processes in the system can be any integer or power of two that is no more than $$\frac{N \times TBS_{max}}{TBS_{max}},$$

where N is a predefined value (e.g., N=16).

For the indication of the maximum number of frequency resources, the indication method can be cell-specific, e.g., carried in the MIB, SIB1 or other system information. For example, the reserved bit in the MIB can be used for the indication of two possible numbers of PRBs, e.g., 6 and 25. Alternatively, the SIB1 can carry the explicit indication of a maximum amount of frequency resources, where the IEs BWP-UplinkCommon, UplinkConfigCommonSIB, or servingCellConfigCommonSIB in the SIB1 can be modified. In this example illustrated by the ASN.1 within TABLE 7, the IE PUSCH-ConfigCommon in the IE BWP-UplinkCommon is modified. The parameters N1, N2, . . . , NK can be any integers, and the condition tag 'Cond NTN' refers to the NTN cases. In the subject example, different maximum amounts of frequency resources for DL and UL can be configured, while in some other examples the maximum amount of frequency resources for DL and UL can be jointly configured, e.g., sharing the same value and being indicated in the IE servingCellConfigCommonSIB.

TABLE 7

An example of IE PUSCH-ConfigCommon modification for indication of max number of PRBs

```
PUSCH-ConfigCommon ::=              SEQUENCE {
    groupHoppingEnabledTransformPrecoding   ENUMERATED {enabled}
OPTIONAL,      -- Need R
    pusch-TimeDomainAllocationList      PUSCH-
        TimeDomainResourceAllocationList
OPTIONAL,      -- Need R
    msg3-DeltaPreamble                  INTEGER (-1..6)
OPTIONAL,      -- Need R
    p0-NominalWithGrant                 INTEGER (-202..24)
OPTIONAL,      -- Need R
    nrofPRBs                            ENUMERATED {N1, N2, .., NK}
OPTIONAL,      -- Cond NTN
    ...
}
```

Alternatively, the maximum amount of frequency resources for PUSCH can be UE-specific. The configuration of the maximum amount of frequency resources can be indicated by UE-specific RRC signaling. An example of the configuration can be as illustrated by ASN.1 within TABLE 8, where the IE PUSCH-ServingCellConfig is modified.

TABLE 8

An example of IE PUSCH-ServingCellConfig modification for indication of max number of PRBs

```
PUSCH-ServingCellConfig ::=             SEQUENCE {
    codeBlockGroupTransmission          SetupRelease { PUSCH-
        CodeBlockGroupTransmission }
OPTIONAL,      -- Need M
    rateMatching                        ENUMERATED {limitedBufferRM}
OPTIONAL,      -- Need S
    xOverhead                           ENUMERATED {xoh6, xoh12,
        xoh18}
OPTIONAL,      -- Need S
    ...,
    [[
    maxMIMO-Layers                      INTEGER (1..4)
OPTIONAL,      -- Need M
    processingType2Enabled              BOOLEAN
OPTIONAL       -- Need M
    ]],
    [[
    maxMIMO-LayersForDCI-Format0-2-r16  INTEGER (1..4)
OPTIONAL       -- Need M
    ]]
    nrofPRBs                            ENUMERATED {N1, N2, .., NK}
OPTIONAL,      -- Cond NTN
}
```

In the above example, the same maximum amount of frequency resources for PUSCH is applied to all UE's bandwidth parts (BWPs) of one serving cell. Alternatively, the maximum amount of frequency resources for PUSCH can be configured as a UE-specific value of a BWP, via IE PUSCH-Config in IE BWP-UplinkDedicated as illustrated by the ASN.1 in TABLE 9.

TABLE 9

An example of IE PUSCH-Config modification for indication of max number of PRBs

| PUSCH-Config ::= | SEQUENCE { |
|---|---|
| dataScramblingIdentityPUSCH OPTIONAL, -- Need S | INTEGER (0..1023) |
| txConfig OPTIONAL, -- Need S | ENUMERATED {codebook, nonCodebook} |
| dmrs-UplinkForPUSCH-MappingTypeA UplinkConfig } OPTIONAL, -- Need M | SetupRelease { DMRS- |
| dmrs-UplinkForPUSCH-MappingTypeB UplinkConfig } OPTIONAL, -- Need M | SetupRelease { DMRS- |
| ... | |
| ul-FullPowerTransmission-r16 fullpowerMode1, fullpoweMode2} OPTIONAL -- Need R ]] | ENUMERATED {fullpower, |
| nrofPRBs OPTIONAL, -- Cond NTN } | ENUMERATED {N1, N2, .., NK} |

In one example, the maximum amount of frequency resources indicated above is applied to both dynamically scheduled PUSCH and UL transmissions without dynamic grant. Alternatively, the maximum amount of frequency resources indicated above is applied to the dynamically scheduled PUSCH, while the maximum amount of frequency resources for UL transmission without dynamic grant can be configured separately, or vice versa. In one example, the maximum amount of frequency resources for UL transmission without dynamic grant can be configured via parameter "cg-nrofPRBs" in the IE ConfiguredGrant-Config, where parameters N1, N2, . . . , NK can be any integers. In one example, the configuration of the maximum amount of frequency resources for UL transmission without dynamic grant, e.g., the parameter "cg-nrofPRBs" in the IE below, can be applied to both Type 1 and Type 2 UL transmissions without dynamic grant. Alternatively, different configurations of maximum amounts of frequency resources can be applied to Type 1 and Type 2 UL transmissions without dynamic grant. For example, the parameter "cg-nrofPRBs" in the IE below applied to Type 2 UL transmissions without dynamic grant, while another parameter "cg1-nrofPRBs" can be introduced to the IE ConfiguredGrantConfig for indication of the maximum TBS for Type 1 UL transmissions without dynamic grant as illustrated by the ASN.1 in TABLE 10:

TABLE 10

An example of IE ConfiguredGrantConfig modification for indication of max number of PRBs

| ConfiguredGrantConfig ::= | SEQUENCE { |
|---|---|
| frequencyHopping interSlot} OPTIONAL, -- Need S | ENUMERATED {intraSlot, |
| cg-DMRS-Configuration | DMRS-UplinkConfig, |
| mcs-Table qam64LowSE} OPTIONAL, -- Need S | ENUMERATED {qam256, |
| mcs-TableTransformPrecoder qam64LowSE} OPTIONAL, -- Need S | ENUMERATED {qam256, |
| uci-OnPUSCH } OPTIONAL, -- Need M | SetupRelease { CG-UCI-OnPUSCH |
| resourceAllocation resourceAllocationType0, resourceAllocationType1, dynamicSwitch }, | ENUMERATED { |
| rbg-Size OPTIONAL, -- Need S | ENUMERATED {config2} |
| powerControlLoopToUse | ENUMERATED {n0, n1}, |
| p0-PUSCH-Alpha | P0-PUSCH-AlphaSetId, |
| transformPrecoder disabled} | ENUMERATED {enabled, |

TABLE 10-continued

An example of IE ConfiguredGrantConfig modification
for indication of max number of PRBs

| | |
|---|---|
| OPTIONAL, -- Need S | |
| nrofHARQ-Processes | INTEGER(1..16), |
| repK | ENUMERATED {n1, n2, n4, n8}, |
| repK-RV | ENUMERATED {s1-0231, s2-0303, S3-0000} |
| OPTIONAL, -- Need R | |
| Periodicity | ENUMERATED { sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12 }, |
| configuredGrantTimer | INTEGER (1..64) |
| OPTIONAL, -- Need R | |
| rrc-ConfiguredUplinkGrant | SEQUENCE { |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization | INTEGER (0..1) |
| OPTIONAL, -- Need R | |
| precodingAndNumberOfLayers | INTEGER (0..63), |
| srs-ResourceIndicator | INTEGER (0..15) |
| OPTIONAL, -- Need R | |
| mcsAndTBS | INTEGER (0..31), |
| frequencyHoppingOffset | INTEGER (1.. maxNrofPhysicalResourceBlocks−1) |
| OPTIONAL, -- Need R | |
| pathlossReferenceIndex | INTEGER (0..maxNrofPUSCH-PathlossReferenceRSs−1), |
| ..., | |
| [[ | |
| pusch-RepTypeIndicator-r16 | ENUMERATED {pusch-RepTypeA,pusch-RepTypeB} |
| OPTIONAL, -- Need M | |
| frequencyHoppingPUSCH-RepTypeB-r16 | ENUMERATED {interRepetition, interSlot} |
| OPTIONAL, -- Cond RepTypeB | |
| timeReferenceSFN-r16 | ENUMERATED {sfn512} |
| OPTIONAL -- Need R | |
| ]] | |
| } | |
| OPTIONAL, -- Need R | |
| ..., | |
| [[ | |
| cg-RetransmissionTimer-r16 | INTEGER (1..64) |
| OPTIONAL, -- Need R | |
| cg-minDFI-Delay-r16 | INTEGER (1..ffsValue) |
| OPTIONAL, -- Need R Upper limit 7 FFS | |
| cg-nrofPUSCH-InSlot-r16 | INTEGER (1..ffsValue) |
| OPTIONAL, -- Need R | |
| cg-nrofSlots-r16 | INTEGER (1..ffsValue) |
| OPTIONAL, -- Need R | |
| cg-StartingFullBW-InsideCOT-r16 | ENUMERATED {ffs} |
| OPTIONAL, -- Need R | |
| cg-StartingFullBW-OutsideCOT-r16 | ENUMERATED {ffs} |
| OPTIONAL, -- Need R | |
| cg-StartingPartialBW-InsideCOT-r16 | ENUMERATED {ffs} |
| OPTIONAL, -- Need R | |
| cg-StartingPartialBW-OutsideCOT-r16 | ENUMERATED {ffs} |
| OPTIONAL, -- Need R | |
| cg-UCI-Multiplexing | ENUMERATED {enabled} |
| OPTIONAL, -- Need R | |
| cg-COT-SharingOffset-r16 | INTEGER (1..ffsValue) |
| OPTIONAL, -- Need R | |
| betaOffsetCG-UCI-r16 | INTEGER (1..ffsValue) |
| OPTIONAL, -- Need R | |
| cg-COT-SharingList-r16 | SEQUENCE (SIZE (1..ffsValue)) OF CG-COT-Sharing-r16 |
| OPTIONAL, -- Need R | |
| harq-ProcID-Offset-r16 | INTEGER (0..15) |
| OPTIONAL, -- Need M | |
| harq-ProcID-Offset2-r16 | INTEGER (0..15) |

TABLE 10-continued

An example of IE ConfiguredGrantConfig modification
for indication of max number of PRBs

```
OPTIONAL,     -- Need M
    configuredGrantConfigIndex-r16         ConfiguredGrantConfigIndex-
        r16
OPTIONAL,     -- Need M
    configuredGrantConfigIndexMAC-r16
                ConfiguredGrantConfigIndexMAC-r16
OPTIONAL,     -- Need M
    periodicityExt-r16                     INTEGER (1..5120)
OPTIONAL,     -- Need M
    startingFromRV0-r16                    ENUMERATED {on, off}
OPTIONAL,     -- Need M
    phy-PriorityIndex-r16                  ENUMERATED {p0, p1}
OPTIONAL,     -- Need M
    autonomousReTx-r16                     ENUMERATED {enabled}
OPTIONAL      -- Cond LCH-BasedPrioritization
]]
    cg-nrofPRBs                            ENUMERATED {N1, N2, .., NK}
OPTIONAL,     -- Cond NTN
}
```

In yet another example, the maximum TBS can be implicitly indicated based on the maximum number of HARQ processes. For example, denoting the current maximum TBS for PUSCH supported in a current system (e.g., NR systems) by $TBS_{cur}$ and the configured number of HARQ processes by L, the maximum TBS can be calculated by any integer or any TBS supported in the current system that is no more than $$\frac{N \times TBS_{max}}{L},$$

where N is a predefined number (e.g., N=16). For the indication of the maximum number of frequency resources, the indication can be the same as the indication of HARQ processes, with the parameter "nrofPRB" replaced by "nrof-HARQ-Processes", e.g., in TABLES 7-10 above. One example with TABLE 9 is to configure different numbers of HARQ processes for different configured UL BWP. In one example, the calculated maximum TBS can be applied to both dynamically scheduled PUSCH and UL transmission without grant. In another example, the calculated maximum TBS is applied to dynamically scheduled PUSCH, while the maximum TBS for UL transmission without grant can be configured separately, or vice versa.

MCS Determination Method

Figure 6:
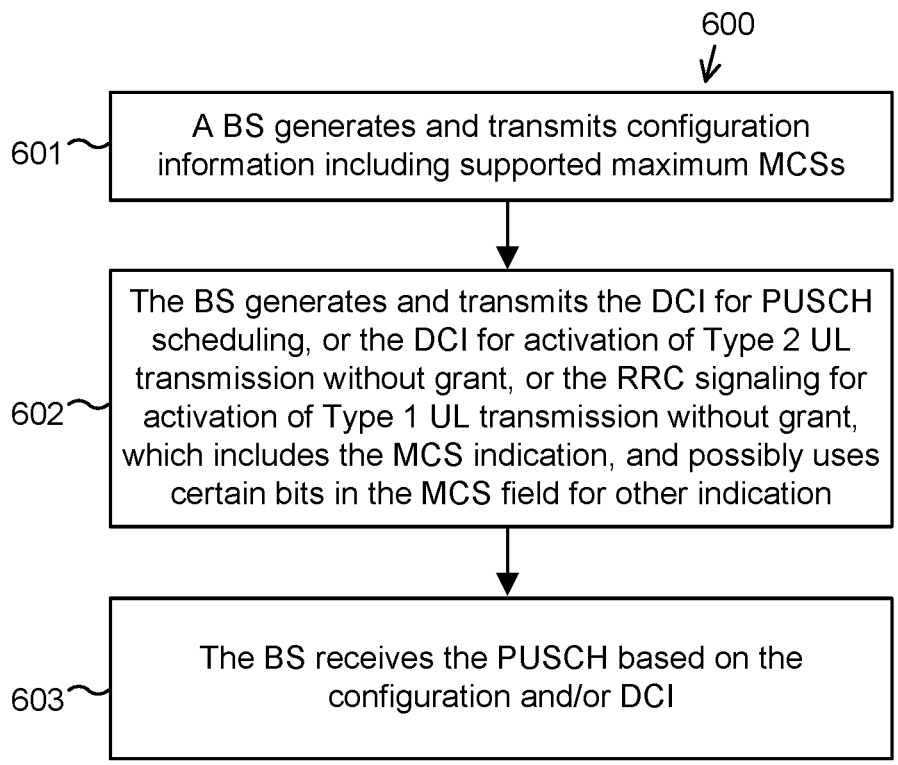
FIG. 6 illustrates a flowchart for an example of MCS indication for PUSCH according to embodiments of the present disclosure.

FIG. 6 illustrates a flowchart for an example of MCS indication for PUSCH according to embodiments of the present disclosure. The method 600 depicted in FIG. 6 is for illustration only. Other embodiments could be used without departing from the scope of this disclosure.

At operation 601, a BS generates and transmits configuration information including the indication of supported MCSs for PUSCH, where the indications can be explicit or implicit, and can be cell-specific or UE-specific. In one example, the maximum MCS index for PDSCH can be the same as the maximum MCS index for PUSCH, and the configuration methods described can be applied to both PDSCH and PUSCH. Alternatively, the configuration of the maximum MCS index for PDSCH and PUSCH can be independent. At operation 602, the BS generates and transmits the DCI for PUSCH scheduling, or the DCI activating the Type 2 UL transmission without grant, or the RRC signaling activating the Type 1 UL transmission without grant, which carries the MCS indication, and possibly uses certain bits in the MCS field for other indication(s). For example, some bits in the MCS field can be used jointly with the HARQ process number field for the indication of a HARQ process number. As another example, some bits in the MCS field can be used for indication of a number of repetitions, if the repetition feature is configured. In yet another example, some bits in the MCS field can be used for indication of whether the modulation order indicated by the MCS field should be overridden to some predefined modulation scheme, e.g., QPSK. In one example, this modulation override indication is used only when repetitions are configured. Alternatively, this modulation override indication can be enabled by higher layer signaling, e.g., cell-specific signaling or UE-specific RRC signaling. At operation 603, the BS receives the PUSCH based on the DCI and/or RRC signaling.

Figure 7:
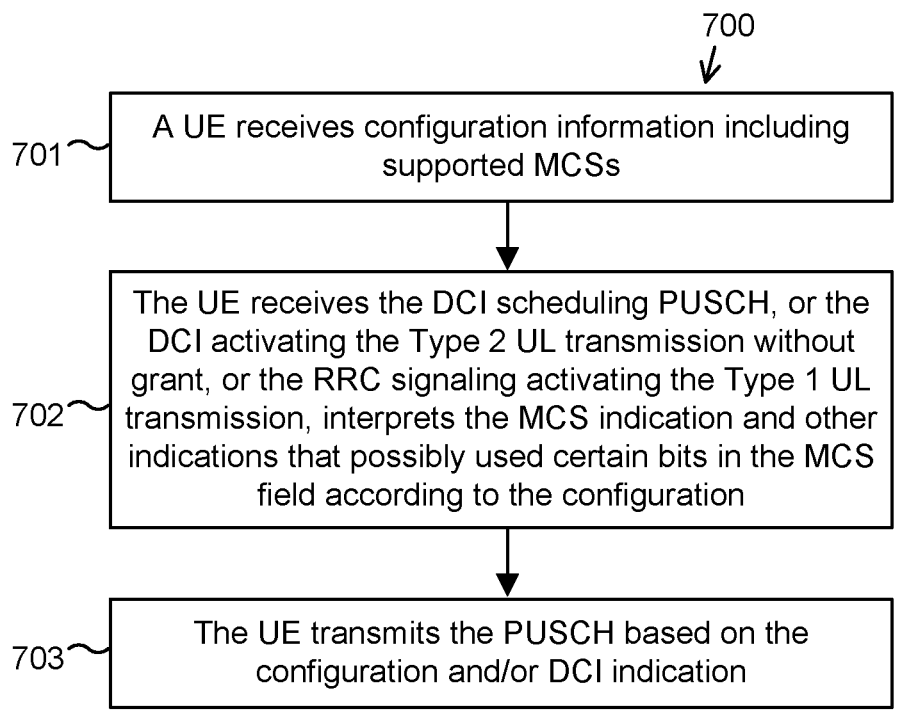
FIG. 7 illustrates a flowchart for an example of MCS determination for PUSCH transmission according to embodiments of the present disclosure.

FIG. 7 illustrates a flowchart for an example of MCS determination for PUSCH transmission according to embodiments of the present disclosure. The method 700 depicted in FIG. 7 is for illustration only. Other embodiments could be used without departing from the scope of this disclosure.

At operation 701, a UE receives configuration information including the indication of supported MCSs for PUSCH, where the indication can be explicit or implicit, and can be cell-specific or UE-specific. At operation 702, the UE receives the DCI or RRC signaling containing the MCS indication. The DCI can be the DCI that dynamically schedules PUSCH, or the DCI activates the Type 2 UL transmission without grant. The RRC signaling can be the one that activates the Type 1 UL transmission without grant. In one example, the maximum MCS index can be limited (e.g., smaller than 31 in NR system), and some bits in the MCS field can be used for other indications, e.g., for joint indication of a HARQ process number, for indication of a number of repetitions, and/or for indication of modulation order override. At operation 703, the UE transmits the PUSCH based on the DCI indication and/or RRC signaling.

In one embodiment of operations 601 and 701, the indication of the maximum MCS index for PDSCH and PUSCH are associated. For example, a mapping between the maximum MCS index for PDSCH and the maximum MCS index for PUSCH can be predefined, e.g., the maximum MCS index for PUSCH is defined to be the same as the configured maximum MCS index for PDSCH. Alternatively, the configuration of the maximum MCS index for PDSCH and PUSCH can be independent.

Explicit Indication of Maximum MCS Index for PUSCH

In one embodiment of operations 601 and 701, the indication of the maximum MCS index for PUSCH can be explicit. For example, the maximum MCS index configuration can be cell-specific, and can be configured by system information, e.g., the MIB, SIB1, other SIBs and/or a new SIB introduced for NTN systems. An example of using the SIB1 for the explicit indication is illustrated in the ASN.1 of TABLE 11, where the IEs BWP-UplinkCommon, UplinkConfigCommonSIB, or servingCellConfigCommonSIB in the SIB1 can be modified. In this example, the IE PUSCH-ConfigCommon in IE BWP-UplinkCommon is modified. The parameters Y1, Y2, . . . , Yn can be any integers, and the condition tag 'Cond NTN' refers to the NTN cases. For other systems, the condition tag can be changed accordingly.

TABLE 11

An example of IE PUSCH-ConfigCommon modification for indication of max MCS index

```
PUSCH-ConfigCommon ::=                    SEQUENCE {
    groupHoppingEnabledTransformPrecoding     ENUMERATED {enabled}
OPTIONAL,    -- Need R
    pusch-TimeDomainAllocationList            PUSCH-
        TimeDomainResourceAllocationList
OPTIONAL,    -- Need R
    msg3-DeltaPreamble                        INTEGER (-1..6)
OPTIONAL,    -- Need R
    p0-NominalWithGrant                       INTEGER (-202..24)
OPTIONAL,    -- Need R
    pusch-maxMCSIndex                         ENUMERATED {Y1, Y2, .., Yn}
OPTIONAL,    -- Cond NTN
    ...
}
```

An example of introducing a new SIB for the indication of maximum TBS is given in the ASN.1 of TABLE 12 below, e.g., SIB15 can be introduced to the system. The parameters X1, X2, . . . , Xn, and Y1, Y2, . . . , Yn can be any integers. In the given example, different maximum MCS indices for PDSCH and PUSCH can be configured, while in some other examples the maximum MCS index for PDSCH and PUSCH can be jointly configured, e.g., sharing the same value.

TABLE 12

An example of IE SIB15 modification for indication of max MCS index

```
SIB15-r17 ::=                SEQUENCE {
    pdsch-maxMCSindex            ENUMERATED {X1, X2, .., Xn}
OPTIONAL,    -- Cond NTN
    pusch-maxMCSindex            ENUMERATED {Y1, Y2, .., Yn}
OPTIONAL,    -- Cond NTN
    ...
}
```

In yet another example of explicit indication, the maximum MCS index configuration can be UE-specific, and can be configured by UE-specific RRC signaling. An example of the configuration is illustrated by the ASN.1 of TABLE 13, where the IE PUSCH-ServingCellConfig is modified.

TABLE 13

An example of IE PUSCH-ServingCellConfig modification for indication of max MCS index

```
PUSCH-ServingCellConfig ::=             SEQUENCE {
    codeBlockGroupTransmission              SetupRelease
        { PUSCH-CodeBlockGroupTransmission }
OPTIONAL,    -- Need M
    rateMatching                            ENUMERATED
                                            {limitedBufferRM}
OPTIONAL,    -- Need S
    xOverhead                               ENUMERATED
        {xoh6, xoh12, xoh18}
OPTIONAL,    -- Need S
    ...,
    [[
    maxMIMO-Layers                          INTEGER (1..4)
OPTIONAL,    -- Need M
    processingType2Enabled                  BOOLEAN
OPTIONAL     -- Need M
    ]],
```

TABLE 13-continued

An example of IE PUSCH-ServingCellConfig modification for indication of max MCS index

```
    [[
    maxMIMO-LayersForDCI-Format0-2-r16      INTEGER (1..4)
OPTIONAL     -- Need M
    ]]
    pusch-maxMCSindex                       ENUMERATED
                                            {Y1, Y2, .., Yn}
OPTIONAL,    -- Cond NTN
}
```

In the above example, the same maximum MCS index is applied to all UE's BWPs of one serving cell. Alternatively, the maximum MCS index for PUSCH can be configured as UE-specific value of a BWP, via the IE PUSCH-Config in the IE BWP-UplinkDedicated as illustrated in the ASN.1 of TABLE 14.

TABLE 14

An example of IE PUSCH-Config modification for indication of max MCS index

```
PUSCH-Config ::=                        SEQUENCE {
    dataScramblingIdentityPUSCH             INTEGER (0..1023)
OPTIONAL,    -- Need S
    txConfig                                ENUMERATED
        {codebook, nonCodebook}
OPTIONAL,    -- Need S
    dmrs-UplinkForPUSCH-MappingTypeA        SetupRelease
        { DMRS-UplinkConfig }
```

TABLE 14-continued

An example of IE PUSCH-Config modification for indication of max MCS index

```
OPTIONAL,    -- Need M
   dmrs-UplinkForPUSCH-MappingTypeB      SetupRelease
      { DMRS-UplinkConfig }
OPTIONAL,    -- Need M
   ul-FullPowerTransmission-r16          ENUMERATED
      {fullpower, fullpowerMode1, fullpoweMode2}
OPTIONAL    -- Need R
   ]]
   pusch-maxMCSindex                     ENUMERATED
                                            {Y1, Y2, Yn}
OPTIONAL,    -- Cond NTN
}
```

In one example, the maximum MCS configuration can be the same for both dynamically scheduled PUSCH and the UL transmissions without dynamic grant. Alternatively, different maximum MCSs can be configured for the dynamically scheduled PUSCH and the UL transmissions without dynamic grant. For example, two parameters would be indicated in the above configuration methods, e.g., "sps-pusch-maxMCSindex" can be added to the above IEs to indicated the maximum TBS for UL transmissions without dynamic grant, while the parameter given in the above IEs, e.g., "pusch-maxMCSindex," can indicate the maximum TBS for the dynamically scheduled PUSCH. The names of these parameters are just examples, and should be considered in an inclusive manner (that is, other names can also be used). Alternatively, the above configuration methods for the maximum MCS can be applied to dynamically scheduled PUSCH, while the maximum MCS for the UL transmissions without dynamic grant can be configured separately, e.g., via the RRC signaling illustrated by the ASN.1 of TABLE 15 below.

TABLE 15

An example of IE ConfiguredGrantConfig modification for indication of max MCS for PUSCH

```
ConfiguredGrantConfig ::=                SEQUENCE {
   frequencyHopping                      ENUMERATED {intraSlot,
      interSlot}
OPTIONAL,    -- Need S
   cg-DMRS-Configuration                 DMRS-UplinkConfig,
   mcs-Table                             ENUMERATED {qam256,
      qam64LowSE}
OPTIONAL,    -- Need S
   mcs-TableTransformPrecoder            ENUMERATED {qam256,
      qam64LowSE}
OPTIONAL,    -- Need S
   uci-OnPUSCH                           SetupRelease { CG-UCI-OnPUSCH
      }
OPTIONAL,    -- Need M
   resourceAllocation                    ENUMERATED {
      resourceAllocationType0, resourceAllocationType1, dynamicSwitch },
   rbg-Size                              ENUMERATED {config2}
OPTIONAL,    -- Need S
   powerControlLoopToUse                 ENUMERATED {n0, n1),
   p0-PUSCH-Alpha                        P0-PUSCH-AlphaSetId,
   transformPrecoder                     ENUMERATED {enabled,
      disabled}
OPTIONAL,    -- Need S
   nrofHARQ-Processes                    INTEGER(1..16),
   repK                                  ENUMERATED {n1, n2, n4, n8},
   repK-RV                               ENUMERATED {s1-0231, s2-0303,
      s3-0000}
OPTIONAL,    -- Need R
   Periodicity                           ENUMERATED { sym2, sym7,
      sym1x14, sym2x14, sym4x14, sym5x14, sym8x14, sym10x14, sym16x14,
      sym20x14, sym32x14, sym40x14, sym64x14, sym80x14, sym128x14,
      sym160x14, sym256x14, sym320x14, sym512x14, sym640x14,
      sym1024x14, sym1280x14, sym2560x14, sym5120x14, sym6, sym1x12,
      sym2x12, sym4x12, sym5x12, sym8x12, sym10x12, sym16x12,
      sym20x12, sym32x12, sym40x12, sym64x12, sym80x12, sym128x12,
      sym160x12, sym256x12, sym320x12, sym512x12, sym640x12,
      sym1280x12, sym2560x12
   },
   configuredGrantTimer                  INTEGER (1..64)
OPTIONAL,    -- Need R
   rrc-ConfiguredUplinkGrant             SEQUENCE {
      timeDomainOffset                   INTEGER (0..5119),
      timeDomainAllocation               INTEGER (0..15),
      frequencyDomainAllocation          BIT STRING (SIZE(18)),
      antennaPort                        INTEGER (0..31),
      dmrs-SeqInitialization             INTEGER (0..1)
OPTIONAL,    -- Need R
      precodingAndNumberOfLayers         INTEGER (0..63),
      srs-ResourceIndicator              INTEGER (0..15)
OPTIONAL,    -- Need R
      mcsAndTBS                          INTEGER (0..31),
      frequencyHoppingOffset             INTEGER (1..
         maxNrofPhysicalResourceBlocks-1)
```

TABLE 15-continued

An example of IE ConfiguredGrantConfig modification
for indication of max MCS for PUSCH

| | |
|---|---|
| OPTIONAL, -- Need R | |
| pathlossReferenceIndex | INTEGER (0..maxNrofPUSCH- |
| PathlossReferenceRSs–1), | |
| ..., | |
| [[ | |
| pusch-RepTypeIndicator-r16 | ENUMERATED {pusch- |
| RepTypeA,pusch-RepTypeB} | |
| OPTIONAL, -- Need M | |
| frequencyHoppingPUSCH-RepTypeB-r16 | ENUMERATED |
| {interRepetition, interSlot} | |
| OPTIONAL, -- Cond RepTypeB | |
| timeReferenceSFN-r16 | ENUMERATED {sfn512} |
| OPTIONAL -- Need R | |
| ]] | |
| } | |
| OPTIONAL, -- Need R | |
| ..., | |
| [[ | |
| cg-RetransmissionTimer-r16 | INTEGER (1..64) |
| OPTIONAL, -- Need R | |
| cg-minDFI-Delay-r16 | INTEGER (1..ffsValue) |
| OPTIONAL, -- Need R Upper limit 7 FFS | |
| cg-nrofPUSCH-InSlot-r16 | INTEGER (1..ffsValue) |
| OPTIONAL, -- Need R | |
| cg-nrofSlots-r16 | INTEGER (1..ffsValue) |
| OPTIONAL, -- Need R | |
| cg-StartingFullBW-InsideCOT-r16 | ENUMERATED {ffs} |
| OPTIONAL, -- Need R | |
| cg-StartingFullBW-OutsideCOT-r16 | ENUMERATED {ffs} |
| OPTIONAL, -- Need R | |
| cg-StartingPartialBW-InsideCOT-r16 | ENUMERATED {ffs} |
| OPTIONAL, -- Need R | |
| cg-StartingPartialBW-OutsideCOT-r16 | ENUMERATED {ffs} |
| OPTIONAL, -- Need R | |
| cg-UCI-Multiplexing | ENUMERATED {enabled} |
| OPTIONAL, -- Need R | |
| cg-COT-SharingOffset-r16 | INTEGER (1..ffsValue) |
| OPTIONAL, -- Need R | |
| betaOffsetCG-UCI-r16 | INTEGER (1..ffsValue) |
| OPTIONAL, -- Need R | |
| cg-COT-SharingList-r16 | SEQUENCE (SIZE (1..ffsValue)) |
| OF CG-COT-Sharing-r16 | |
| OPTIONAL, -- Need R | |
| harq-ProcID-Offset-r16 | INTEGER (0..15) |
| OPTIONAL, -- Need M | |
| harq-ProcID-Offset2-r16 | INTEGER (0..15) |
| OPTIONAL, -- Need M | |
| configuredGrantConfigIndex-r16 | ConfiguredGrantConfigIndex-r16 |
| OPTIONAL, -- Need M | |
| configuredGrantConfigIndexMAC-r16 | ConfiguredGrantConfigIndexMAC- |
| | r16 |
| OPTIONAL, -- Need M | |
| periodicityExt-r16 | INTEGER (1..5120) |
| OPTIONAL, -- Need M | |
| startingFromRV0-r16 | ENUMERATED {on, off} |
| OPTIONAL, -- Need M | |
| phy-PriorityIndex-r16 | ENUMERATED {p0, p1} |
| OPTIONAL, -- Need M | |
| autonomousReTx-r16 | ENUMERATED {enabled} |
| OPTIONAL -- Cond LCH-BasedPrioritization | |
| ]] | |
| cg-pusch-maxMCSIndex | ENUMERATED {Y1, Y2, .., Yn} |
| OPTIONAL, -- Cond NTN | |
| } | |

Implicit Indication of Maximum MCS Index for PUSCH

In one embodiment of operations 601 and 701, the configuration of supported MCSs for PUSCH can be implicit. In one example, the configuration can be cell-specific. As one example, a mapping between the maximum MCS index for PUSCH and the system scenarios/modes can be predefined. Once the system scenario/mode is indicated, the maximum MCS index for PUSCH can be determined accordingly, e.g., $MCS_{max-N}$ for system scenario/mode N, where N is an index such as 1, 2, etc. As one example of this embodiment, the configuration of a system scenario/mode can be cell-specific, and can be configured by system information, e.g., via the MIB, SIB1, other SIBs and/or a new SIB introduced for the systems. For example, 1 reserved bit in the MIB can be used to indicate two scenarios/modes. Another example of using the SIB1 for this indication is illustrated in TABLE 6 above. In one example, the mapping between the maximum MCS and the system scenarios/modes can be the same for dynamically scheduled PUSCH and UL transmissions without dynamic grant. Alternatively, different mappings between the maximum MCS and the system scenarios/modes can be predefined for dynamically scheduled PUSCH and UL transmissions without dynamic grant.

Modulation Override Configuration

In one embodiment of operations 601 and 701, the indicated modulation scheme can be overridden. For example, when the modulation override is enabled, the modulation scheme indicated by the MCS field can be overridden to a predefined modulation scheme, e.g., to modulation with lower order such as π/2-binary phase shift keying (BPSK) or quadrature phase shift keying (QPSK). The modulation scheme to be overridden to can be predefined, e.g., to pi/2-BPSK or QPSK. In one example of this embodiment, the modulation override can be configured by higher layer signaling, e.g., cell-specific signaling via the MIB, SIB1, or other SIBs, or the modulation override can be configured by UE-specific RRC signaling. The signaling method can be similar to the indication of the TBS for PUSCH, e.g., introducing a parameter such as "modulationOverridenpusch" to the IEs in TABLES 1-5. Alternatively, the signaling method can be predefined as to whether the modulation override is configured for certain system scenarios/modes, which can be indicated, e.g., by the IE in TABLE 6. In one example, the configuration of the modulation override can depend on other configurations, e.g., the modulation override is configured when repetitions and/or transmission time interval (TTI) bundling are configured. In one example, the modulation override for PDSCH and PUSCH can be jointly configured. Alternatively, the modulation override for PDSCH and PUSCH can be separately configured, e.g., there can be cases where the modulation override for PDSCH is configured while modulation override for PUSCH is not configured, or vice versa.

In one example, the modulation override is enabled when modulation override is configured. In another example, the modulation override is enabled when modulation override is configured and the PUSCH dynamically scheduled by the DCI or UL transmission without dynamic grant is indicated to have certain number of repetitions (e.g., number of repetitions>1) and/or a certain number of TTIs for TTI-bundling. In this example, there is no dynamic indication of the modulation override. In another example, when the modulation override is configured, the DCI can dynamically indicate the enabling/disabling of the modulation override. In yet another example, when the modulation override is configured, the modulation override is enabled when the coding rate is within certain range, e.g., a coding rate using an overridden modulation scheme is no larger than certain value X, where the value X can be predefined or configured by higher layer signaling.

DCI Design

In one embodiment, the MCS field in the DCI can be configurable. Depending on the configuration of the maximum MCS index, the number of bits in the MCS field can be adjusted accordingly. For example, in cases where the configured maximum MCS index is 15, the MCS field in the DCI can be 4 bits.

In another embodiment, the supported MCS can be limited and there can be some bits available in the MCS field to be used for other indication(s). For example, the MCS indexes can be configured to be up to 7 or 15, and there can be 1 or 2 bits available in MCS field, which can be used for other indication(s).

Figure 8:
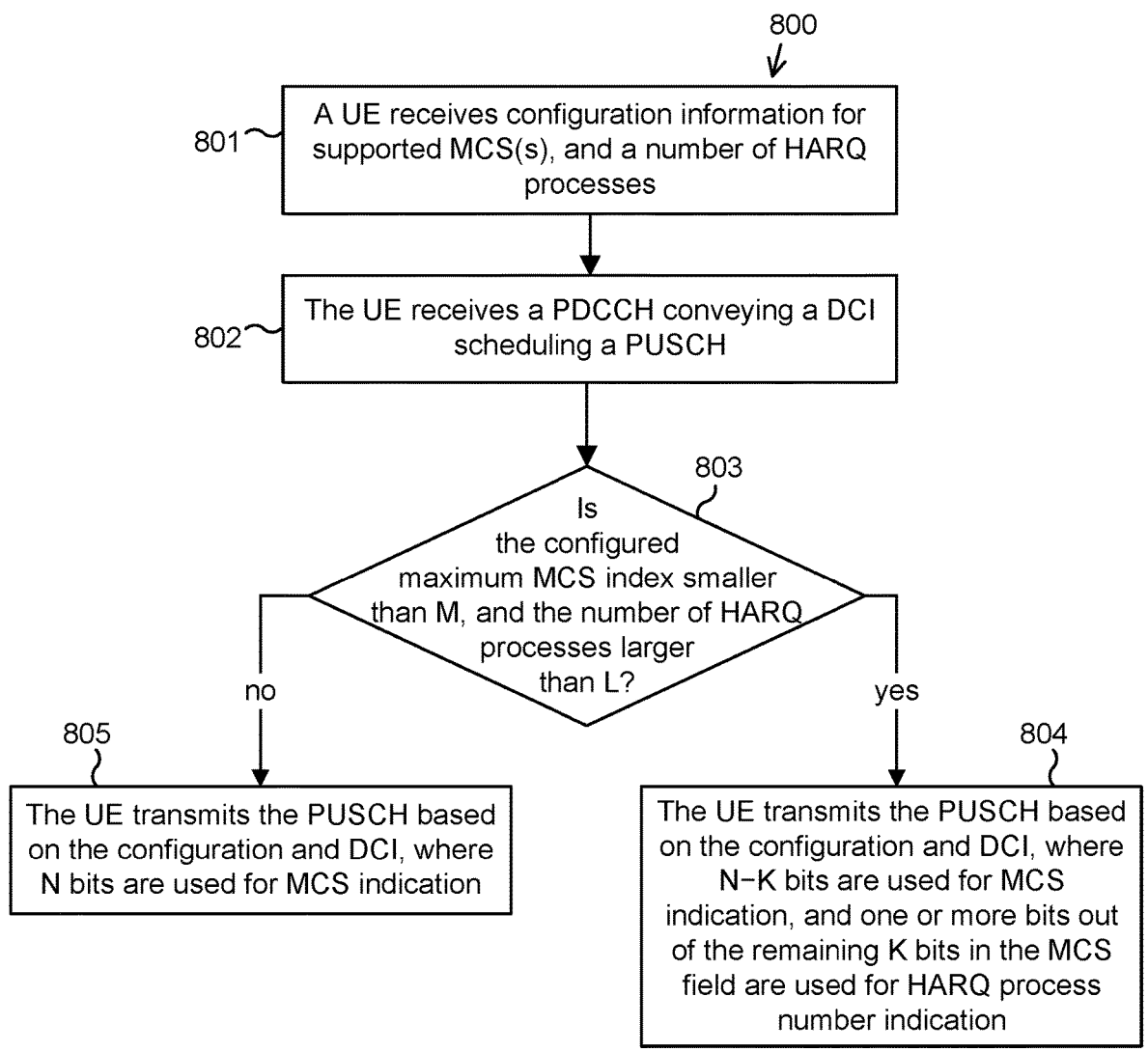
FIG. 8 illustrates a flowchart for an example of PUSCH transmission where one or more bits in the MCS field can be interpreted for indication of a HARQ process number according to embodiments of the present disclosure.

FIG. 8 illustrates a flowchart for an example of PUSCH transmission where one or more bits in the MCS field can be interpreted for indication of a HARQ process number according to embodiments of the present disclosure. The method 800 depicted in FIG. 8 is for illustration only. Other embodiments could be used without departing from the scope of this disclosure.

At operation 801, a UE receives the configuration information, which can include the configuration of supported MCS and/or the number of HARQ processes for PUSCH. At operation 802, the UE receives a PDCCH conveying a DCI, which schedules a PUSCH. At operation 803, the UE checks whether the maximum MCS index configured is smaller than M, where M is a predefined number, e.g., 8 or 16. The UE also checks whether the number of HARQ processes configured for PUSCH is larger than L, where L is a predefined number, e.g., 16. If the configured maximum MCS index is smaller than M and the configured number of HARQ processes is larger than L, the UE transmits the PUSCH based on the configuration and DCI indication at operation 804, where the UE interprets N-K bits (e.g., the N-K MSBs) in the MCS field of the DCI for the indication of the MCS index, and one or more bits out of the remaining K bits (e.g., the K LSBs) in the MCS field for the indication of a HARQ process number, where N and K can be any integers, e.g., N can be 5 and K can be 1 or 2. For example, an existing HARQ process number field in the DCI indicates the MSBs of the HARQ process number, while the K LSBs in the MCS field can be re-interpreted as the LSBs of the HARQ process number indication. If the configured maximum MCS index is not smaller than M or the configured number of HARQ processes is less than or equal to L, the UE transmits PUSCH based on the configuration and DCI indication at operation 805, where the UE interprets N bits in the MCS field of the DCI for the indication of MCS index, where N can be any integer such as 5. This example can be applied to dynamically scheduled PUSCH.

Figure 9:
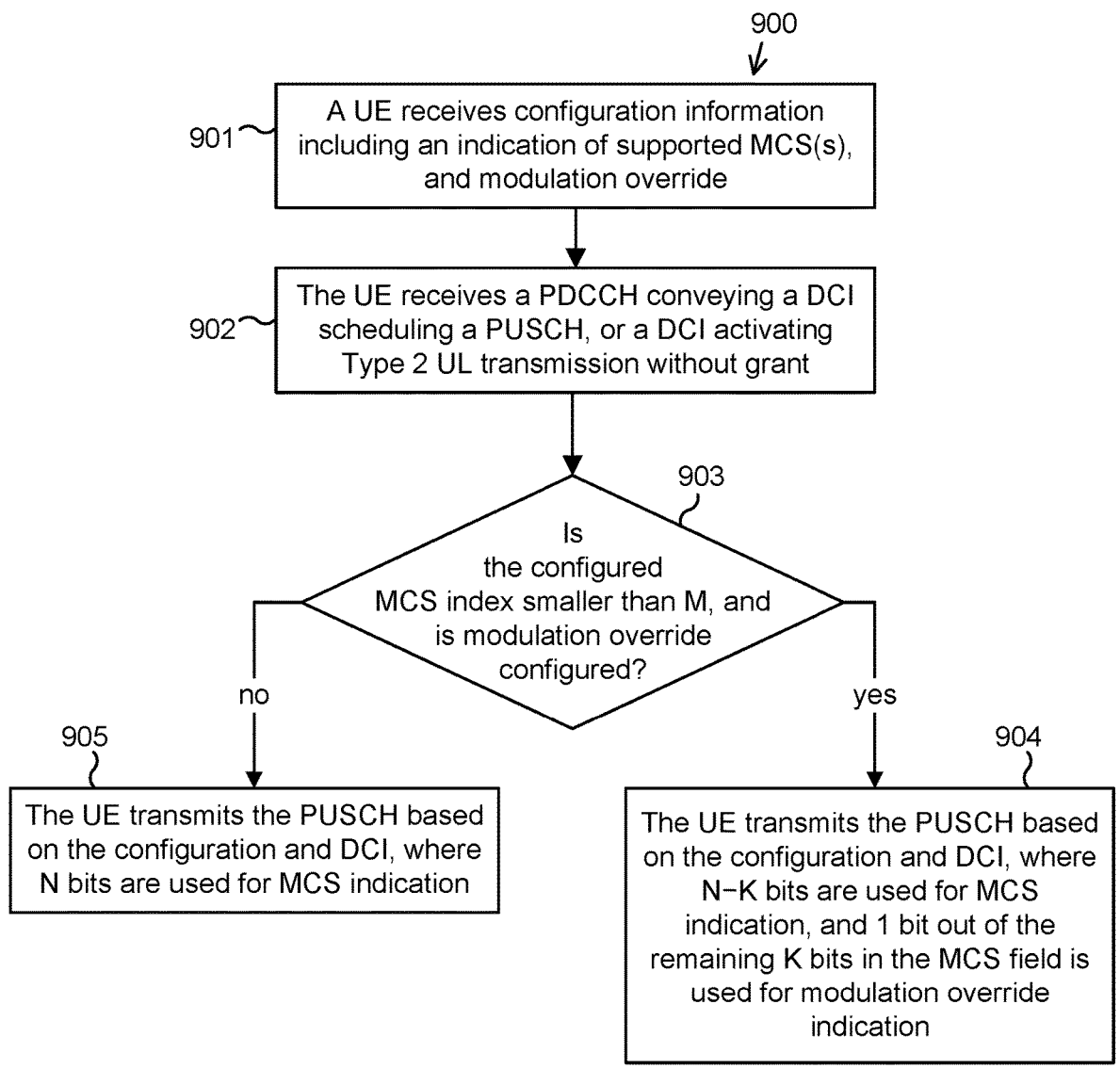
FIG. 9 illustrates a flowchart for an example of PUSCH transmission where one or more bits in the MCS field can be interpreted for indication of a HARQ process number according to embodiments of the present disclosure.

FIG. 9 illustrates a flowchart for an example of PUSCH transmission where one or more bits in the MCS field can be interpreted for indication of a HARQ process number according to embodiments of the present disclosure. The method 900 depicted in FIG. 9 is for illustration only. Other embodiments could be used without departing from the scope of this disclosure.

At operation 901, a UE receives the configuration information, which can include the configuration of supported MCS(s) and/or modulation override. Modulation override can be configured, e.g., by the SIB1, or other system information, or UE-specific RRC signaling. At operation 902, the UE receives a PDCCH conveying a DCI that schedules a PUSCH, or a DCI that activates Type 2 UL transmission without grant. At operation 903, the UE checks whether the maximum MCS index configured is smaller than M, where M is a predefined number, e.g., 8 or 16. The UE also checks whether modulation override is configured. If the configured maximum MCS index is smaller than M and modulation override is configured, the UE transmits the PUSCH based on the configuration and DCI indication at operation 904, where the UE interprets N-K bits (e.g., the N-K MSBs) in the MCS field of the DCI as the indication of MCS index, and one or more bits out of the remaining K bits (e.g., the K LSBs) in the MCS field a the indication of modulation override, where N and K can be any integers, e.g., N can be 5 and K can be 1 or 2. For example, K can be 1, and when this 1 bit is 0, modulation override is disabled, but when this 1 bit is 1, modulation override is enabled, or vice versa. If the configured maximum MCS index is not smaller than M or modulation override is not configured, the UE transmits the PUSCH based on the configuration and DCI indication at operation 905, where the UE interprets N bits in the MCS field of the DCI as the indication of the MCS index, where N can be any integer such as 5. This can be applied to a dynamically scheduled PUSCH, e.g., with the DCI for PUSCH scheduling, and/or UL transmission without grant, e.g., with the DCI for activation of Type 2 UL transmission without grant. For the UL transmission without grant, the disabling/enabling of modulation override can be applied to all UL transmissions activated by the activation DCI.

Figure 10:
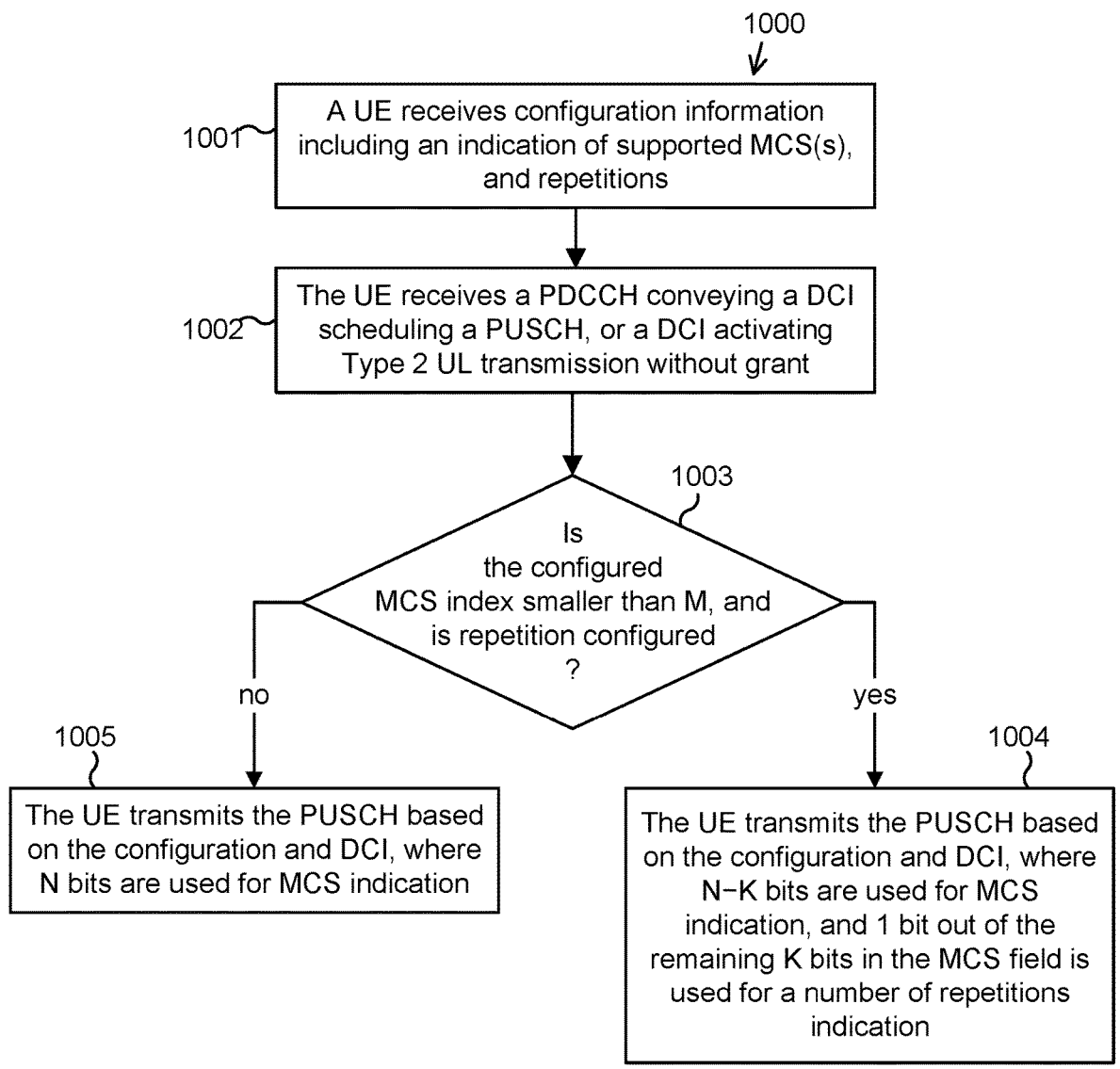
FIG. 10 illustrates a flowchart for an example of PUSCH transmission where one or more bits in an MCS field can be interpreted as an indication of a number of repetitions according to embodiments of the present disclosure.

FIG. 10 illustrates a flowchart for an example of PUSCH transmission where one or more bits in an MCS field can be interpreted as an indication of a number of repetitions according to embodiments of the present disclosure. The method 1000 depicted in FIG. 10 is for illustration only. Other embodiments could be used without departing from the scope of this disclosure.

At operation 1001, a UE receives the configuration information, which can include the configuration of supported MCS(s) and/or repetitions. Repetitions of the PUSCH and/or the PDCCH can be configured, e.g., by the SIB1, or other system information, or UE-specific RRC signaling. At operation 1002, the UE receives a PDCCH conveying a DCI, which schedules a PUSCH or activates Type 2 UL transmission without grant. At operation 1003, the UE checks whether the maximum MCS index configured is smaller than M, where M is a predefined number, e.g., 8 or 16. The UE also checks whether repetition is configured. If the configured maximum MCS index is smaller than M and repetition is configured, the UE transmits the PUSCH based on the configuration and DCI indication at operation 1004, where the UE interprets N−K bits (e.g., the N−K MSBs) in the MCS field of the DCI as the indication of MCS index, and one or more bits out of the remaining K bits (e.g., the K LSBs) in the MCS field as the indication of a number of repetitions for the PDCCH and/or the PUSCH, where N and K can be any integers, e.g., N can be 5 and K can be 1 or 2. For example, one or more sets of a number of repetitions can be configured by RRC signaling, with each set containing X repetitions, e.g., X=2 for {Nrep1, Nrep2}, where Nrep1 and Nrep2 can be any integers such as 1, 2, 4, 8, 16, . . . , 1024. K can be $\log_2$ X to indicate which one in the configured set of repetitions should be used for the PDCCH or the PUSCH, e.g., K=1 bit for X=2 with 0 indicating Nrep1 and with 1 indicating Nrep2. If the configured maximum MCS index is not smaller than M or repetition is not configured, the UE transmits the PUSCH based on the configuration and DCI indication at operation 1005, where the UE interprets N bits in the MCS field of the DCI as the indication of the MCS index, where N can be any integer such as 5. This can be applied to dynamically scheduled PUSCHs, e.g., with the DCI for PUSCH scheduling, and/or UL transmission without grant, e.g., with the DCI for activation of Type 2 UL transmission without grant. For the UL transmission without grant, the number of repetitions can be applied to all PUSCHs activated by the activation DCI.

Re-Interpretation of Certain Bits in the Resource Allocation Field in DCI for Other Indication for PUSCH In embodiments where the number of PRBs that can be allocated for PUSCH is limited, one or more bits in the frequency domain resource assignment can be reinterpreted for other indications. For example, the configured BWP size can still be large for scheduling flexibility, and the number of PRBs that can be allocated for the PUSCH can be limited, e.g., to 1 or 2 PRBs.

In one example, when the value of the HARQ process number is configured to be larger than a predefined value (e.g. 16), Y bits (e.g., the Y LSBs) in the frequency domain resource assignment field in the DCI can be re-interpreted as an indication of the HARQ process number, where Y can be any integer (e.g., Y can be 1 or 2). This example can be applied to dynamically scheduled PUSCHs.

In another example, when the modulation override is configured, Y bits (e.g., the Y LSBs) in the frequency domain resource assignment field in the DCI can be re-interpreted as an indication of modulation override. Y can be any integer, e.g., Y=1 with the 1 bit being 0 for disabling of modulation override and the 1 bit being 1 for enabling of modulation override, or vice versa. This can be applied to dynamically scheduled PUSCHs, e.g., with the DCI for PUSCH scheduling, and/or UL transmission without grant, e.g., with the DCI for activation of Type 2 UL transmission without grant. For the UL transmission without grant, the modulation override enabling/disabling can be applied to all PUSCHs activated by the activation DCI.

In some other examples, when repetition of the PDCCH and/or the PUSCH is configured, Y bits (e.g., the Y LSBs) in the frequency domain resource assignment field in the DCI can be re-interpreted as an indication of the number of repetitions. For example, one or more sets of repetitions can be configured by RRC signaling (e.g., the MIB, SIB1 or other SIBS, or UE-specific RRC signaling), with each set containing X repetitions, e.g., X=2 for {Nrep1, Nrep2}, where Nrep1 and Nrep2 can be any integers such as 1, 2, 4, 8, 16, . . . , 1024. Y can be $\log_2$ X to indicate which one in the configured set of repetitions should be used for the PDCCH or the PUSCH, e.g., Y=1 bit for X=2 with 0 indicating Nrep1 and 1 indicating Nrep2. This can be applied to dynamically scheduled PUSCHs, e.g., with the DCI for PUSCH scheduling, and/or UL transmission without grant, e.g., with the DCI for activation of Type 2 UL transmission without grant. For the UL transmission without grant, the number of repetitions can be applied to all PUSCHs activated by the activation DCI.

Figure 11:
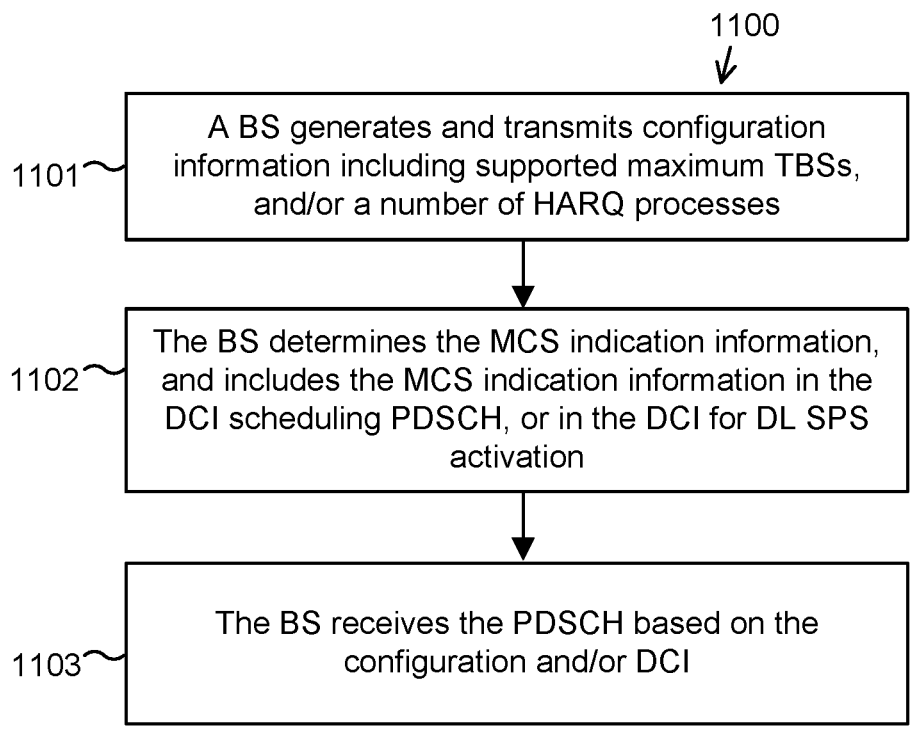
FIG. 11 illustrates a flowchart for an example of TBS indication for PDSCH transmission according to embodiments of the present disclosure.

FIG. 11 illustrates a flowchart for an example of TBS indication for PDSCH transmission according to embodiments of the present disclosure. The method 1100 depicted in FIG. 11 is for illustration only. Other embodiments could be used without departing from the scope of this disclosure.

At operation 1101, a BS generates and transmits configuration information including the indication of a maximum TBS for PDSCH, and/or an indication of a number of HARQ processes, where the indications can be explicit or implicit, and can be cell-specific or UE-specific. As one example, the indications of maximum TBS and the number of HARQ processes can be associated. For example, the maximum TBS can be explicitly indicated, while the number of HARQ processes can be implicitly indicated based on the indicated maximum TBS, or vice versa. Alternatively, the indication of maximum TBS and the number of HARQ processes can be independent. At operation 1102, the BS determines the MCS indication information and includes the MCS indication information in the DCI scheduling the PDSCH, or in the DCI for DL semi-persistent scheduling (SPS). At operation 1103, the BS receives the PDSCH based on the configuration and the DCI.

Figure 12:
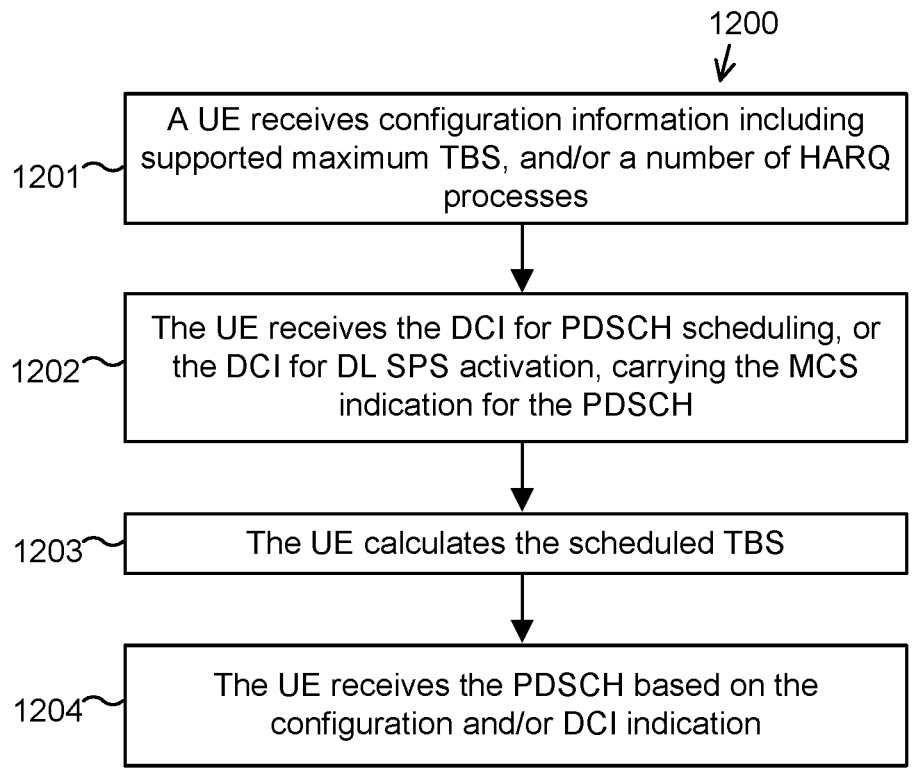
FIG. 12 illustrates a flowchart for an example of TBS determination for PDSCH reception according to embodiments of the present disclosure.

FIG. 12 illustrates a flowchart for an example of TBS determination for PDSCH reception according to embodiments of the present disclosure. The method 1200 depicted in FIG. 12 is for illustration only. Other embodiments could be used without departing from the scope of this disclosure.

At operation 1201, a UE receives the configuration information including the indication of the maximum TBS for PDSCH, and/or an indication of a number of HARQ processes, where the indication can be explicit or implicit, and can be cell-specific or UE-specific. As one example, the indications of maximum TBS and the number of HARQ processes can be associated, as discussed above. Alternatively, the indication of the maximum TBS and the number of HARQ processes can be independent. At operation 1202, the UE receives the PDCCH carrying the DCI with an MCS indication. In one example, the DCI can be the one for PDSCH dynamic scheduling. In another example, the DCI can be the one for DL SPS activation. At operation 1203, the UE calculates the scheduled TBS based on the configured maximum TBS and the MCS indication in the DCI. For example, denoting the TBS indicated by the MCS field in the DCI by TBS', and the maximum configured TBS by $TBS_{max}$, the determined TBS can be $$\min_{\square}(TBS', TBS_{max}).$$

At operation 1204, the UE receives the PDSCH based on the configuration and DCI indication, considering the calculated the TBS value. In examples of dynamic scheduling of the PDSCH, the DCI can include the HARQ process number indication, and the UE determines the HARQ process number based on the configuration and DCI indication.

Explicit Indication of Maximum TBS for Pdsch

In one embodiment of operations 1101 and 1202, the indication method of the maximum TBS can be explicit. For example, the maximum TBS configuration can be cell-specific, and can be configured by system information, e.g., the MIB, SIB1, other SIBs and/or a new SIB. An example of using the SIB1 for the explicit indication is illustrated in the ASN.1 of TABLE 16, where the IEs BWP-Downlink-Common, DownlinkConfigCommonSIB, or servingCell-ConfigCommonSIB in the SIB1 can be modified. In this example, the IE PDSCH-ConfigCommon in the IE BWP-DownlinkCommon is modified. The parameters N1, N2, . . . , NK can be any integers, and the condition tag 'Cond NTN' refers to the NTN cases. The condition tag 'Cond NTN' throughout this disclosure is given as an example, and should be considered in inclusive manner. For systems other than NTN, the condition tag can be changed accordingly.

TABLE 26

An example of IE PDSCH-ConfigCommon modification for indication of max TBS

```
--ANSISTART
--TAG-PDSCH-CONFIGCOMMON-START
PDSCH-ConfigCommon ::=        SEQUENCE {
   pdsch-TimeDomainAllocationList    PDSCH-
      TimeDomainResourceAllocationList
OPTIONAL,  -- Need R
   maxTBSPDSCH                  ENUMERATED {N1, N2, .., NK}
OPTIONAL,  -- Cond NTN
   ...
}
```

In the given example, different maximum TBSs for the PDSCH and the PUSCH can be configured, while in some other examples the maximum TBS for the PDSCH and the PUSCH can be jointly configured, e.g., sharing the same value and being indicated in the IE servingCellConfigCommonSIB.

An example of introducing a new SIB for the indication of maximum TBS is given by the ASN.1 in TABLE 17 below, e.g., SIB15 can be introduced:

TABLE 17

An example of IE SIB15 modification for indication of max TBS

```
SIB15-r17 ::=        SEQUENCE {
   maxTBSPDSCH           ENUMERATED {N1, N2, .., NK}
OPTIONAL
   maxTBSPUSCH           ENUMERATED {M1, M2, .., ML}
OPTIONAL
   ...
}
```

The parameters N1, N2, . . . , NK, and M1, M2, . . . , ML can be any integers. In the given example, different maximum TBS for PDSCH and PUSCH can be configured, while in some other examples the maximum TBS for PDSCH and PUSCH can be jointly configured, e.g., sharing the same value.

As another example of explicit indication, the maximum TBS configuration can be UE-specific, and can be configured by UE-specific RRC signaling. An example of the configuration can be as indicated by the ASN.1 in TABLE 18 below, where the IE PDSCH-ServingCellConfig is modified:

TABLE 18

An example of IE PDSCH-ServingCellConfig modification for indication of max TBS

```
PDSCH-ServingCellConfig ::=   SEQUENCE {
   codeBlockGroupTransmission     SetupRelease { PDSCH-
      CodeBlockGroupTransmission }
OPTIONAL,   -- Need M
   xOverhead                      ENUMERATED {xOh6,
      xOh12, xOh18}
OPTIONAL,   -- Need S
   pucch-Cell                     ServCellIndex
OPTIONAL,   -- Cond SCellAddOnly
   ...,
   [[
   maxMIMO-Layers                 INTEGER (1..8)
OPTIONAL,   -- Need M
   processingType2Enabled         BOOLEAN
OPTIONAL    -- Need M
   ]],
   [[
   pdsch-CodeBlockGroupTransmissionList-r16    SetupRelease {
      PDSCH-CodeBlockGroupTransmissionList-r16 }
OPTIONAL    -- Need M
   ]]
   maxTBSPUSCH                    ENUMERATED {N1, N2, ..,
      NK}
OPTIONAL,   -- Cond NTN
}
```

In the above example, the same maximum TBS is applied to all of the UE's BWPs of one serving cell. Alternatively, the maximum TBS can be configured as a UE-specific value of a BWP, via the IE PDSCH-Config in the IE BWP-DownlinkDedicated as in the ASN.1 of TABLE 19:

TABLE 19

An example of IE PDSCH-Config modification for indication of max TBS

| | |
|---|---|
| PDSCH-Config ::= | SEQUENCE { |
| dataScramblingIdentityPDSCH | INTEGER (0..1023) |
| OPTIONAL, -- Need S | |
| dmrs-DownlinkForPDSCH-MappingTypeA | SetupRelease { DMRS-DownlinkConfig } |
| OPTIONAL, -- Need M | |
| dmrs-UplinkForPUSCH-MappingTypeB | SetupRelease { DMRS-UplinkConfig } |
| OPTIONAL, -- Need M | |
| ... | |
| pdsch-TimeDomainAllocationList-v16xy | SetupRelease { PDSCH-TimeDomainResourceAllocationList-v16xy } |
| OPTIONAL, -- Need M | |
| repetitionSchemeConfig-r16 | SetupRelease { RepetitionschemeConfig-r16} |
| OPTIONAL -- Need M | |
| ]] | |
| maxTBSPDSCH | ENUMERATED {N1, N2, .., NK} |
| OPTIONAL, -- Cond NTN | |
| } | |

In some examples, the increased number of HARQ processes can be jointly configured with the TBS reduction feature. As one example of the above embodiment with explicit indication of maximum TBS, the number of HARQ processes can be implicitly indicated based on configured maximum TBS. Denoting the maximum TBS supported in a system (e.g., in current NR system) or a predefined TBS value by $TBS_{cur}$ and the maximum TBS configured for the system by $TBS_{max}$, the number of HARQ processes in the system can be any integer or power of two that is no more than $$\frac{N \times TBS_{max}}{TBS_{max}},$$

where N is a predefined number (e.g., N=16). With this option, the UE soft buffer size can be kept the same as in certain predefined system (e.g., as in NR systems) or be kept as a certain predefined value.

In one embodiment, the above configuration methods can be applied to both the dynamically scheduled PDSCH and the SPS PDSCH. In one example of this embodiment, the same maximum TBS value is applied to both the dynamically scheduled PDSCH and the SPS PDSCH. In another example of this embodiment, different values of the maximum TBS can be configured for the dynamically scheduled PDSCH and the SPS PDSCH. In this example, two parameters would be indicated in the above configuration methods, e.g., "sps-maxTBSPDSCH" can be added to the above IEs to indicated the maximum TBS for SPS PDSCH, while the parameter given in the above IEs, e.g., "maxTBSPDSCH," can indicate the maximum TBS for the dynamically scheduled PDSCH. The name of these parameters are just examples, and should be considered in an inclusive manner (that is, other names can also be used).

Alternatively, the above methods are applied to the dynamically scheduled PDSCH only, while the following methods can be applied to the SPS PDSCH for configuration of the maximum TBS. The maximum TBS for the SPS PDSCH can be explicitly indicated in UE-specific RRC signaling, e.g., in the IE SPS-Config. The parameters N1, N2, . . . , NK can be any integers.

TABLE 20

An example of IE SPS-Config modification for indication of maximum TBS for SPS PDSCH

| | |
|---|---|
| -- ASN1START | |
| -- TAG-SPS-CONFIG-START | |
| SPS-Config ::= | SEQUENCE { |
| Periodicity | ENUMERATED {ms10, ms20, ms32, ms40, ms64, ms80, ms128, ms160, ms320, ms640, spare6, spare5, spare4, spare3, spare2, spare1}, |
| nrofHARQ-Processes | INTEGER (1..8), |
| n1PUCCH-AN | PUCCH-ResourceId |
| OPTIONAL, -- Need M | |
| mcs-Table | ENUMERATED {qam64LowSE} |
| OPTIONAL, -- Need S | |
| ..., | |
| [[ | |
| sps-ConfigIndex-r16 | SPS-ConfigIndex-r16 |
| OPTIONAL, -- Need N | |
| harq-ProcID-Offset-r16 | INTEGER (0..15) |
| OPTIONAL, -- Need N | |
| periodicityExt-r16 | INTEGER (1..5120) |
| OPTIONAL, -- Need N | |
| harq-CodebookID-r16 | INTEGER (1..2) |
| OPTIONAL -- Need N | |
| ]] | |
| sps-maxTBSPDSCH | ENUMERATED {N1, N2, .., NK} |
| OPTIONAL, -- Cond NTN | |
| } | |
| -- TAG-SPS-CONFIG-STOP | |
| -- ASN1STOP | |

Implicit Indication of Maximum TBS for PDSCH

As another embodiment of operations 1101 and 1201, the indication method for maximum TBS for PDSCH can be implicit. As one example, a mapping between the maximum TBS and the system scenarios/modes can be predefined. Once the system scenario/mode is indicated, the maximum TBS can be determined accordingly, e.g., $TBS_{max-N}$ for system scenario/mode N, where N is an index such as 1, 2, etc. In one example, the number of HARQ processes can be configured similarly, a mapping between the number of HARQ processes and the system scenarios/modes can be predefined. Once the system scenario/mode is indicated, the number of HARQ processes can be determined accordingly, e.g., $X_N$ for system scenario/mode N. As one example of this embodiment, the configuration of system scenario/mode can be cell-specific, and can be configured by system information, e.g., via the MIB, SIB1, other SIBs and/or a new SIB introduced for the systems. For example, 1 reserved bit in the MIB can be used to indicate two scenarios/modes. Another example of using SIB1 for this indication is illustrated by the ASN.1 with TABLE 21 below, where the parameter N can be any integer. The parameter in the example below uses "NTNmode" as an example for NTN systems, while other names can be used for other systems. In one example, the mapping between the maximum TBS and the system scenarios/modes can be the same for the dynamically scheduled PDSCH and SPS PDSCH. Alternatively, different mappings between the maximum TBS and the system scenarios/modes can be predefined for the dynamically scheduled PDSCH and SPS PDSCH. For example, this example can be applied for configuration of maximum TBS for dynamically scheduled PDSCH, while the maximum TBS for SPS PDSCH can be configured separately, or vice versa.

TABLE 21

An example of IE SIB1 modification for indication of the system scenario/mode

```
SIB1 ::=                              SEQUENCE {
  cellSelectionInfo                   SEQUENCE {
    q-RxLevMin                        Q-RxLevMin,
    q-RxLevMinOffset                  INTEGER (1..8)
OPTIONAL,  -- Need S
    q-RxLevMinSUL                     Q-RxLevMin
OPTIONAL,  -- Need R
    q-QualMin                         Q-QualMin
OPTIONAL,  -- Need S
    q-QualMinOffset                   INTEGER (1..8)
OPTIONAL   -- Need S
  }
OPTIONAL,  -- Cond Standalone
  cellAccessRelatedInfo               CellAccessRelatedInfo,
  connEstFailureControl               ConnEstFailureControl
OPTIONAL,  -- Need R
  si-SchedulingInfo                   SI-SchedulingInfo
OPTIONAL,  -- Need R
  servingCellConfigCommon             ServingCellConfigCommonSIB
OPTIONAL,  -- Need R
  ims-EmergencySupport                ENUMERATED {true}
OPTIONAL,  -- Need R
  eCallOverIMS-Support                ENUMERATED {true}
OPTIONAL,  -- Cond Absent
  ue-TimersAndConstants               UE-TimersAndConstants
OPTIONAL,  -- Need R
  uac-BarringInfo                     SEQUENCE {
    uac-BarringForCommon               UAC-BarringPerCatList
OPTIONAL,  -- Need S
    uac-BarringPerPLMN-List           UAC-BarringPerPLMN-List
OPTIONAL,  -- Need S
    uac-BarringInfoSetList            UAC-BarringInfoSetList,
    uac-AccessCategory1-SelectionAssistanceInfo CHOICE {0
      plmnCommon                      UAC-AccessCategory1-
         SelectionAssistanceInfo,
      individualPLMNList              SEQUENCE (SIZE (2..maxPLMN))
          OF UAC-AccessCategory1-SelectionAssistanceInfo
    }
OPTIONAL   -- Need S
  }
OPTIONAL,  -- Need R
  useFullResumeID                     ENUMERATED {true}
OPTIONAL,  -- Need R
  lateNonCriticalExtension            OCTET STRING
OPTIONAL,
  nonCriticalExtension                SIB1-v16xy-IEs
OPTIONAL
  NTNmode                             INTEGER {1..N}
OPTIONAL,  -- Need S
}
```

As another example, the maximum TBS can be implicitly indicated based on the configured number of HARQ processes. Denoting the maximum TBS supported in a system or a predefined TBS value by $TBS_{CUR}$ and the configured number of HARQ processes by L, the maximum TBS can be calculated by any integer or any TBS supported in a predefined system (e.g., NR system) that is no more than $$\frac{N \times TBS_{CUR}}{L}$$

where N is a predefined number (e.g. N=16). In one example, the calculated maximum TBS can be applied to both the dynamically scheduled PDSCH and the SPS PDSCH. In another example, the calculated maximum TBS is applied to the dynamically scheduled PDSCH, while the maximum TBS for the SPS PDSCH can be configured separately, or vice versa.

The configuration of the number of HARQ processes can be cell-specific in one example, which can be carried in the MIB, SIB1 or other system information. For example, reserved bit in the MIB can be used for the indication of two possible numbers of HARQ processes, e.g., 16 and 32. Alternatively, the SIB1 can carry the explicit indication of number of HARQ processes, where the IEs BWP-DownlinkCommon, DownlinkConfigCommonSIB, or servingCellConfigCommonSIB in the SIB1 can be modified. In this example illustrated by the ASN.1 in TABLE 22, the IE pdsch-ConfigCommon in IE BWP-DownlinkCommon is modified. The parameters N1, N2, . . . , NK can be any integers, and the condition tag 'Cond NTN' refers to the NTN cases. In the given example, different number of HARQ processes for DL and UL can be configured, while in some other examples the number of HARQ processes for DL and UL can be jointly configured, e.g. sharing the same value and being indicated in the IE servingCellConfigCommonSIB.

TABLE 22

An example of IE PDSCH-ConfigCommon modification for indication of number of HARQ processes

```
-- ASN1START
-- TAG-PDSCH-CONFIGCOMMON-START
PDSCH-ConfigCommon ::=          SEQUENCE {
    pdsch-TimeDomainAllocationList    PDSCH-
        TimeDomainResourceAllocationList
OPTIONAL,  -- Need R
    nrofHARQ-Processes              ENUMERATED {N1, N2, ..,
                                    NK}
OPTIONAL,  -- Cond NTN
    ...
}
-- TAG-PDSCH-CONFIGCOMMON-STOP
-- ASN1STOP
```

Alternatively, the number of HARQ processes can be UE-specific. The configuration of the number of HARQ processes can be indicated by UE-specific RRC signaling. An example of the configuration can be as illustrated by the ASN.1 in TABLE 23, where the IE PDSCH-ServingCellConfig is modified:

TABLE 23

An example of IE PDSCH-ServingCellConfig modification for indication of number of HARQ processes

```
PDSCH-ServingCellConfig ::=      SEQUENCE {
    codeBlockGroupTransmission     SetupRelease { PDSCH-
        CodeBlockGroupTransmission }
OPTIONAL,    -- Need M
    xOverhead                      ENUMERATED { xOh6, xOh12,
        xOh18 }
OPTIONAL,    -- Need S
    nrofHARQ-ProcessesForPDSCH     ENUMERATED {n2, n4, n6, n10,
        n12, n16}
OPTIONAL,    -- Need S
    pucch-Cell                     ServCellIndex
OPTIONAL,    -- Cond SCellAddOnly
    ...,
    [[
    maxMIMO-Layers                 INTEGER (1..8)
OPTIONAL, -- Need M
    processingType2Enabled         BOOLEAN
OPTIONAL   -- Need M
    ]],
    [[
    pdsch-CodeBlockGroupTransmissionList-r16    SetupRelease {
        PDSCH-CodeBlockGroupTransmissionList-r16 }
OPTIONAL   -- Need M
    ]]
    nrofHARQ-Processes             ENUMERATED {N1, N2, .., NK}
OPTIONAL,    -- Cond NTN
}
```

In the above example, the same number of HARQ processes is applied to all of the UE's BWPs of one serving cell. Alternatively, the number of HARQ processes can be configured as a UE-specific value of a BWP, via the IE PDSCH-Config in IE BWP-DownlinkDedicated. In one example illustrated by the ASN.1 in TABLE 24, the number of HARQ processes configured for different DL BWP can be different.

TABLE 24

An example of IE PDSCH-Config modification for indication of number of HARQ processes

```
PDSCH-Config ::=         SEQUENCE {
    dataScramblingIdentityPDSCH          INTEGER (0..1023)
OPTIONAL,  -- Need S
    dmrs-DownlinkForPDSCH-MappingTypeA   SetupRelease { DMRS-
        DownlinkConfig }
OPTIONAL,  -- Need M
    dmrs-DownlinkForPDSCH-MappingTypeB   SetupRelease { DMRS-
        DownlinkConfig }
OPTIONAL,  -- Need M
    ...
    pdsch-TimeDomainAllocationList-v16xy SetupRelease { PDSCH-
        TimeDomainResourceAllocationList-v16xy }
OPTIONAL,  -- Need M
    repetitionSchemeConfig-r16           SetupRelease {
RepetitionSchemeConfig-r16}
OPTIONAL   -- Need M
    ]]
nrofHARQ-Processes                       ENUMERATED {N1, N2, ..,
NK}
OPTIONAL,  -- Cond NTN
}
```

In one example, the number of HARQ processes indicated above is applied to the dynamically scheduled PDSCH, while the number of HARQ processes for the SPS PDSCH is configured by the IE SPS-Config. Alternatively, the number of HARQ processes indicated above can be the total number of HARQ processes including both the dynamically scheduled PDSCH and the SPS PDSCH. In some examples, the number of HARQ processes for the SPS PDSCH can be configured via the parameter "nrofHARQ-Processes" in the IE SPS-Config, where the possible value of "nrofHARQ-Processes" can be extended, e.g., extended from INTEGER (1 . . . 8) in TABLE 20 to INTEGER (1 . . . N), where N can be any integer, e.g., 16 or 32.

In yet another example, the maximum TBS can be implicitly indicated based on the maximum number of frequency resources that can be allocated for the PDSCH, e.g., the maximum number of PRBs that can be allocated for the PDSCH. Then the maximum TBS can be calculated based on the TBS determination in Section 5.1.3.2 in [38.214]. In examples where HARQ enhancement is jointly configured with TBS reduction feature, the number of HARQ processes can be implicitly indicated based on the configured maximum TBS. As discussed above, denoting the current maximum TBS supported in a system by $TBS_{CUR}$ and the maximum TBS configured for the considered systems by $TBS_{MAX}$, the number of HARQ processes can be any integer or power of two that is no more than $$\frac{16 TBS_{cur}}{TBS_{max}}.$$

With this option, the UE soft buffer size can be kept the same as in a current system or be kept as a certain predefined value. For the indication of the maximum number of frequency resources, the indication method can be the same or similar as the methods for the indication of HARQ processes, with the parameter "nrofHARQ-Processes" replaced by "nrofPRB", e.g., in TABLE 22-TABLE 24.

In one example, the above configuration of the maximum number of frequency resources can be applied to both the dynamically scheduled PDSCH and the SPS PDSCH. Alternatively, the above configuration of the maximum number of frequency resources can be applied to the dynamically scheduled PDSCH, while the maximum number of frequency resources for the SPS PDSCH can be configured separately, or vice versa. For example, the maximum number of frequency resources for the SPS PDSCH can be configured in the IE SPS-Config as illustrated by TABLE 25 below, where N1, N2, . . . , NK can be any integers. Then the maximum TBS can be calculated based on the TBS determination in Section 5.1.3.2 in [38.214].

TABLE 25

An example of IE SPS-Config modification for indication of maximum number of PRBs for SPS PDSCH -- ASN1START
-- TAG-SPS-CONFIG-START
SPS-Config ::=          SEQUENCE {
    Periodicity              ENUMERATED {ms10, ms20, ms32,
       ms40, ms64, ms80, ms128, ms160, ms320, ms640, spare6,
       spare5, spare4, spare3, spare2, spare1},
    nrofHARQ-Processes       INTEGER (1..8),
    n1PUCCH-AN               PUCCH-ResourceId
    OPTIONAL, -- Need M
    mcs-Table                ENUMERATED {qam64LowSE}

TABLE 25-continued

Figure 13:
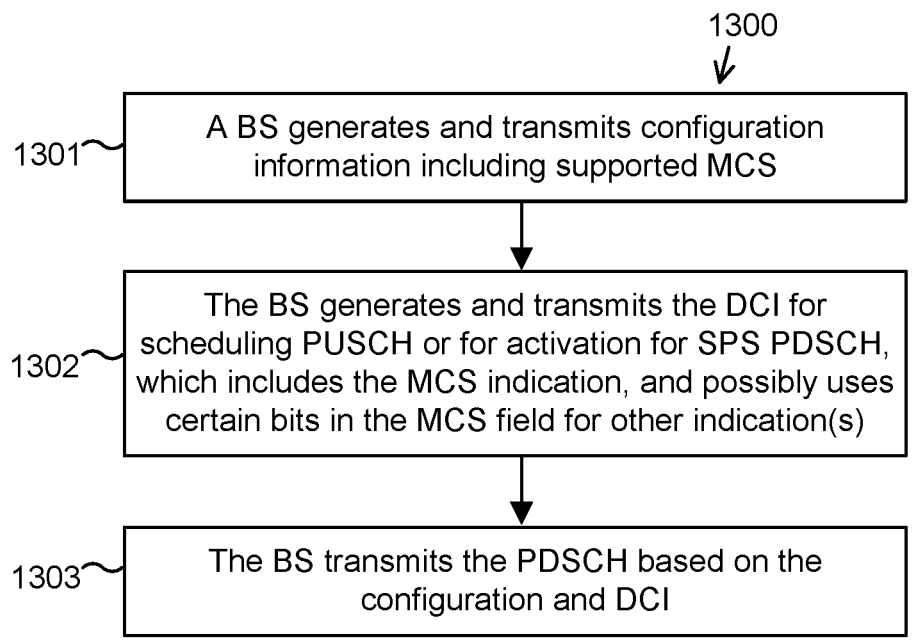
FIG. 13 illustrates a flowchart for an example of MCS indication for PDSCH transmission according to embodiments of the present disclosure.

An example of IE SPS-Config modification for indication of maximum number of PRBs for SPS PDSCH OPTIONAL, -- Need S
...,
[[
    sps-ConfigIndex-r16        SPS-ConfigIndex-r16
    OPTIONAL, -- Need N
    harq-ProcID-Offset-r16     INTEGER (0..15)
    OPTIONAL, -- Need N
    periodicityExt-r16         INTEGER (1..5120)
    OPTIONAL, -- Need N
    harq-CodebookID-r16        INTEGER (1..2)
    OPTIONAL, -- Need N
]]
    sps-maxPRBPDSCH            ENUMERATED {N1, N2, .., NK}
    OPTIONAL, -- Cond NTN
}
-- TAG-SPS-CONFIG-STOP
-- ASN1STOP MCS Determination Method FIG. 13 illustrates a flowchart for an example of MCS indication for PDSCH transmission according to embodiments of the present disclosure. The method 1300 depicted in FIG. 13 is for illustration only. Other embodiments could be used without departing from the scope of this disclosure.

At operation 1301, a BS generates and transmits configuration information including the indication of supported MCS for the PDSCH, where the indication can be explicit or implicit, and can be cell-specific or UE-specific. In one example, the maximum MCS index for PUSCH can be the same as the maximum MCS index for PDSCH, and the configuration methods discussed above for PDSCH can be applied without the need of an additional configuration method for PUSCH. Alternatively, the configuration of the maximum MCS index for the PDSCH and PUSCH can be independent. At operation 1302, the BS generates and transmits the DCI for PDSCH scheduling or for activation of the SPS PDSCH, where the DCI can carry the MCS indication information and possible use certain bits in the MCS field in the DCI for other indication(s). For example, some bits in the MCS field can be used jointly with the HARQ process number field for the indication of the HARQ process number. As another example, some bits in the MCS field can be used for indication of disabling HARQ-ACK feedback. In yet another example, some bits in the MCS field can be used for indication of a number of repetitions, if the repetition feature is configured. Some bits in the MCS field can be used for indication of whether the modulation order indicated by the MCS field should be overridden to some predefined modulation scheme, e.g., QPSK. In one example, this modulation override indication is used only when repetitions are configured. Alternatively, this modulation override indication can be enabled by higher layer signaling, e.g., cell-specific signaling or UE-specific RRC signaling. At operation 1303, the BS transmits the PDSCH based on the DCI and/or configuration.

Figure 14:
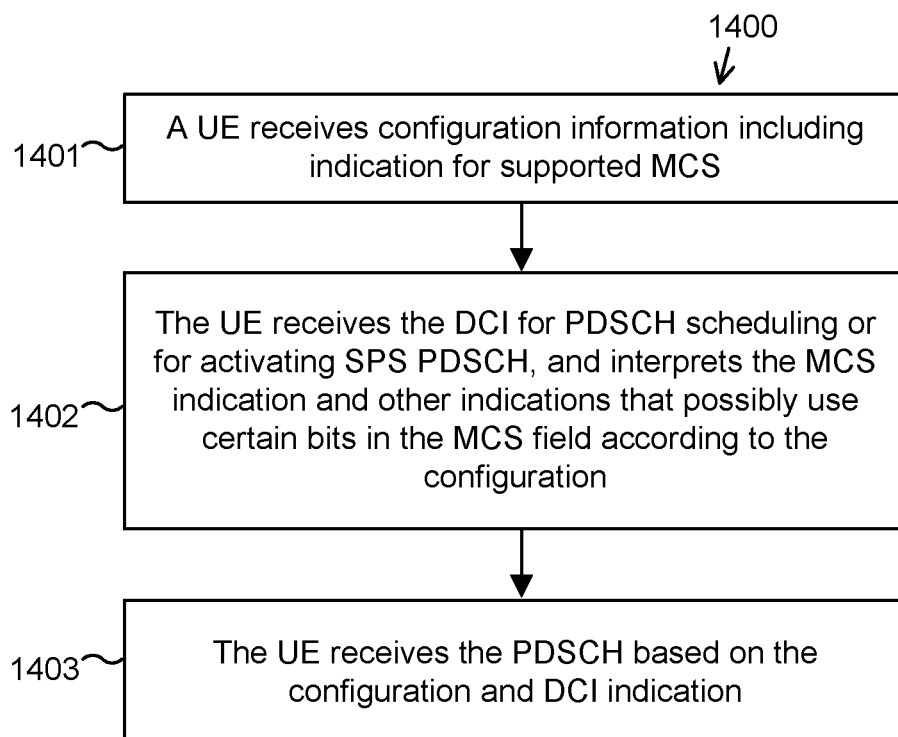
FIG. 14 illustrates a flowchart for an example of MCS indication for PDSCH transmission according to embodiments of the present disclosure.

FIG. 14 illustrates a flowchart for an example of MCS indication for PDSCH transmission according to embodiments of the present disclosure. The method 1400 depicted in FIG. 14 is for illustration only. Other embodiments could be used without departing from the scope of this disclosure.

At operation 1401, a UE receives configuration information including the indication of supported MCSs for the PDSCH, where the indications can be explicit or implicit, and can be cell-specific or UE-specific. At operation 1402, the UE receives the DCI for the PDSCH scheduling or for activation of SPS PDSCH, and interprets the MCS indication and other indications based on the configuration. In one example, the maximum MCS index can be limited (e.g., smaller than 31 in NR system), and some bits in the MCS field can be used for other indications, e.g., for joint indication of the HARQ process number, for disabling of HARQ-ACK feedback, for indication of a number of repetitions, and/or for indication of modulation order override. At operation 1403, the UE receives the PDSCH based on the configuration and DCI indication.

In one embodiment of operations 1301 and 1401, the indication of the maximum MCS index for PDSCH and PUSCH are associated. For example, a mapping between the maximum MCS index for the PDSCH and the maximum MCS index for the PUSCH can be predefined, e.g. the maximum MCS index for the PUSCH is defined to be the same as the configured maximum MCS index for the PDSCH. Alternatively, the configuration of the maximum MCS index for the PDSCH and the PUSCH can be independent.

Explicit Indication of Maximum MCS Index for PDSCH

In one embodiment of operations 1301 and 1401, the configuration of supported MCSs can be explicit. In one example, the configuration can be cell-specific, and can be configured by system information, e.g., the MIB, SIB1, other SIBs and/or a new SIB. An example of using the SIB1 for explicit indication is in the ASN.1 within TABLE 26, where the IEs BWP-DownlinkCommon, DownlinkConfig-CommonSIB, or servingCellConfigCommonSIB in SIB1 can be modified. In this example, the IE PDSCH-Config-Common in the IE BWP-DownlinkCommon is modified. The parameters X1, X2, . . . , Xn can be any integers, and the condition tag 'Cond NTN' refers to the NTN cases. For other systems, the condition tag can be changed accordingly.

TABLE 26

An example of IE PDSCH-ConfigCommon modification for indication of max MCS index

```
-- ASN1START
-- TAG-PDSCH-CONFIGCOMMON-START
PDSCH-ConfigCommon ::=   SEQUENCE {
   pdsch-TimeDomainAllocationList   PDSCH-
      TimeDomainResourceAllocationList
OPTIONAL, -- Need R
   pdsch-maxMCSindex           ENUMERATED {X1, X2, .., Xn}
OPTIONAL, -- Cond NTN
   ...
}
-- TAG-PDSCH-CONFIGCOMMON-STOP
-- ASN1STOP
```

An example of introducing a new SIB for indication of the maximum TBS is given below in the ASN.1 of TABLE 27, e.g., SIB15 can be introduced to the system. The parameters X1, X2, . . . , Xn, and Y1, Y2, . . . , Yn can be any integers. In the given example, different maximum MCS indices for the PDSCH and the PUSCH can be configured, while in some other examples the maximum MCS index for the PDSCH and the PUSCH can be jointly configured, e.g., sharing the same value.

TABLE 27

An example of IE SIB15 modification for indication of max MCS index

```
SIB15-r17 ::=           SEQUENCE {
   pdsch-maxMCSindex        ENUMERATED {X1, X2, .., Xn}
OPTIONAL, -- Cond NTN
   pusch-maxMCSindex        ENUMERATED {Y1, Y2, .., Yn}
OPTIONAL, -- Cond NTN
   ...
}
```

Alternatively, the explicit indication of supported MCSs can be UE-specific, and can be configured by UE-specific RRC signaling. An example of the configuration can be as illustrated by the ASN.1 of TABLE 28, where the IE PDSCH-ServingCellConfig is modified.

TABLE 28

An example of IE PDSCH-ServingCellConfig modification for indication of max MCS index

```
PDSCH-ServingCellConfig ::=       SEQUENCE {
   codeBlockGroupTransmission         SetupRelease {
      PDSCH-CodeBlockGroupTransmission }
OPTIONAL,    -- Need M
   xOverhead                    ENUMERATED { xOh6,
      xOh12, xOh18 }
OPTIONAL,    -- Need S
   nrofHARQ-ProcessesForPDSCH        ENUMERATED {n2, n4,
      n6, n10, n12, n16}
OPTIONAL,    -- Need S
   pucch-Cell                   ServCellIndex
OPTIONAL,    -- Cond SCellAddOnly
   ...,
   [[
   maxMIMO-Layers               INTEGER (1..8)
OPTIONAL,    -- Need M
   processingType2Enabled       BOOLEAN
OPTIONAL,    -- Need M
   ]],
   [[
   pdsch-CodeBlockGroupTransmissionList-r16
      SetupRelease { PDSCH-
      CodeBlockGroupTransmissionList-r16 }
OPTIONAL    -- Need M
   ]]
   pdsch-maxMCSindex            ENUMERATED {X1, X2,
      .., Xn}
OPTIONAL,    -- Cond NTN
}
```

In the above example, the same maximum MCS index is applied to all of the UE's BWPs of one serving cell. Alternatively, the maximum MCS index can be configured as a UE-specific value of a BWP, via the IE PDSCH-Config in the IE BWP-DownlinkDedicated as illustrated by ASN.1 in TABLE 29.

TABLE 29

An example of IE PDSCH-Config modification for indication of max MCS index

| | |
|---|---|
| PDSCH-Config ::= | SEQUENCE { |
|   dataScramblingIdentityPDSCH | INTEGER (0.. 1023) |
|   OPTIONAL, -- Need S | |
|   dmrs-DownlinkForPDSCH-MappingTypeA | SetupRelease { DMRS- |
|     DownlinkConfig } | |
|   OPTIONAL, -- Need M | |
|   dmrs-DownlinkForPDSCH-MappingTypeB | SetupRelease { DMRS- |
|     DownlinkConfig } | |
|   OPTIONAL, -- Need M | |
| ... | |
|   pdsch-TimeDomainAllocationList-v16xy | SetupRelease { PDSCH- |
|     TimeDomainResourceAllocationList-v16xy } | |
|   OPTIONAL, -- Need M | |
|   repetitionSchemeConfig-r16 | SetupRelease { |
|     RepetitionSchemeConfig-r16} | |
|   OPTIONAL -- Need M | |
|   ]] | |
|   pdsch-maxMCSindex | ENUMERATED {X1, X2, .., Xn} |
|   OPTIONAL, -- Cond NTN | |
| } | |

In one example, different maximum MCS indices for the PDSCH and the PUSCH can be configured, while in some other examples the maximum MCS index for the PDSCH and the PUSCH can be jointly configured, e.g., sharing the same value and configured by any of the methods discussed above.

In one example, the configured maximum MCS can be applied to both the dynamically scheduled PDSCH and the SPS PDSCH. Alternatively, the configured maximum MCS can be applied to the dynamically scheduled PDSCH, while the maximum MCS for the SPS PDSCH can be configured separately, or vice versa. In the latter example, two parameters for configuration of the maximum MCS can be introduced, with one for the dynamically scheduled PDSCH, e.g., "pdsch-maxMCSindex," and the other for the SPS PDSCH, e.g., "sps-pdsch-maxMCSindex," which can be added to the IEs discussed above (e.g., the IEs in SIB1 such as PDSCH-ConfigCommon, a new SIB, PDSCH-ServingCellConfig or PDSCH-Config). As another example, the maximum MCS for the SPS PDSCH can be configured by UE-specific RRC signaling, e.g., in the IE SPS-Config. The parameters N1, N2, . . . , NK can be any integers, e.g., 0, 1, 2, . . . , 31.

TABLE 30

An example of IE SPS-Config modification for indication of maximum MCS for SPS PDSCH

| | |
|---|---|
| -- ASN1START | |
| -- TAG-SPS-CONFIG-START | |
| SPS-Config ::= | SEQUENCE { |
|   Periodicity | ENUMERATED {ms10, ms20, ms32, |
|     ms40, ms64, ms80, ms128, ms160, ms320, ms640, spare6, spare5, | |
|     spare4, spare3, spare2, spare1}, | |
|   nrofHARQ-Processes | INTEGER (1..8), |
|   n1PUCCH-AN | PUCCH-ResourceId |
|   OPTIONAL, -- Need M | |
|   mcs-Table | ENUMERATED {qam64LowSE} |
|   OPTIONAL, -- Need S | |
|   ..., | |
|   [[ | |
|   sps-ConfigIndex-r16 | SPS-ConfigIndex-r16 |
|   OPTIONAL, -- Need N | |
|   harq-ProcID-Offset-r16 | INTEGER (0..15) |
|   OPTIONAL, -- Need N | |
|   periodicityExt-r16 | INTEGER (1..5120) |
|   OPTIONAL, -- Need N | |
|   harq-CodebookID-r16 | INTEGER (1..2) |
|   OPTIONAL -- Need N | |
|   ]] | |
|   sps-pdsch-maxMCSindex | ENUMERATED {N1, N2, .., NK} |
|   OPTIONAL, -- Cond NTN | |
| } | |
| -- TAG-SPS-CONFIG-STOP | |
| -- ASN1STOP | |

Implicit Indication of Maximum MCS Index for PDSCH

In one embodiment of operations 1301 and 1401, the configuration of the supported MCSs can be implicit. In one example, the configuration can be cell-specific. As one example, a mapping between the maximum MCS index and the system scenarios/modes can be predefined. Once the system scenario/mode is indicated, the maximum MCS index can be determined accordingly, e.g., $MCS_{max-N}$ for scenario/mode N, where N is an index such as 1, 2, etc. As one example of this embodiment, the configuration of system scenario/mode can be cell-specific, and can be configured by system information, e.g., via the MIB, SIB1, other SIBS and/or a new SIB introduced for the systems. For example, 1 reserved bit in the MIB can be used to indicate two scenarios/modes. Another example of using the SIB1 for this indication is illustrated in TABLE 21 above. In one example, the mapping between the maximum MCS and the system scenarios/modes can be the same for the dynamically scheduled PDSCH and the SPS PDSCH. Alternatively, different mappings between the maximum MCS and the system scenarios/modes can be predefined for the dynamically scheduled PDSCH and the SPS PDSCH.

Modulation Override Configuration

In one embodiment of operations 1302 and 1402, the indicated modulation scheme can be overridden. For example, when modulation override is enabled, the modulation scheme indicated by the MCS field can be overridden to a predefined modulation scheme, e.g., to modulation with a lower order such as QPSK. The modulation scheme to be overridden to can be predefined, e.g., to QPSK. In one example of this embodiment, modulation override can be configured by higher layer signaling, e.g., cell-specific signaling via the MIB, SIB1, or other SIBS, or modulation override can be configured by UE-specific RRC signaling.

The signaling method can be similar to the indication of the TBS for the PDSCH, e.g., introducing a parameter such as "modulationOverriden-pdsch" to the IEs in TABLE 15-TABLE 20. Alternatively, signaling method can be pre-defined so that whether the modulation overridden is configured for certain system scenarios/modes, which can be indicated, e.g., by the IE in TABLE 21. In one example, the configuration of modulation override can depend on other configurations, e.g., the modulation override is configured when repetitions and/or TTI bundling are configured.

In one example, modulation override is enabled when modulation override is configured. In one example, modulation override is enabled when modulation override is configured and the PDSCH dynamically scheduled by the DCI or the SPS PDSCH is indicated to have a certain number of repetitions (e.g., number of repetitions>1) and/or a certain number of TTIs for TTI-bundling. In this example, there is no dynamic indication of modulation override. In another example, when modulation override is configured, the DCI can dynamically indicate the enabling/disabling of modulation override. In yet another example, when modulation override is configured, modulation override is enabled when the coding rate is within certain range, e.g., a coding rate using the overridden modulation scheme is no larger than certain value X, where the value X can be predefined or configured by higher layer signaling.

DCI Design

In one embodiment, the MCS field in the DCI can be configurable. Depending on the configuration of the maximum MCS index, the number of bits in the MCS field can be adjusted accordingly. For example, in cases where the configured maximum MCS index is 15, the MCS field in the DCI can be 4 bits.

In one embodiment, the supported MCS can be limited and there can be some bits available in the MCS field to be used for other indications. For example, the MCS indexes can be configured to be up to 7 or 15, and there can be 1 or 2 bits available in the MCS field, which can be used for other indications.

Figure 15:
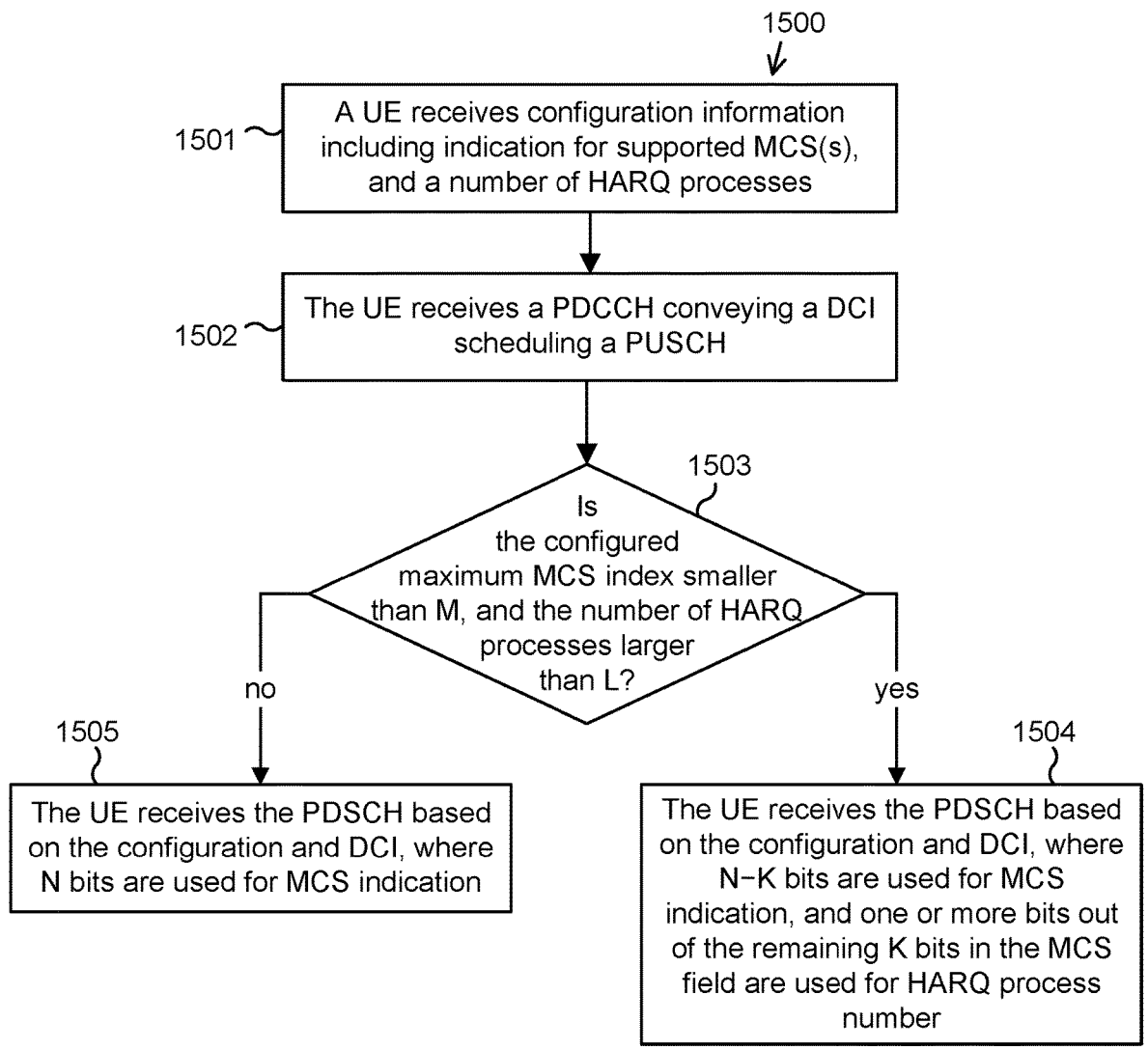
FIG. 15 illustrates a flowchart for an example of PDSCH reception, where one or more bits in MCS field can be reinterpreted for indication of HARQ process number according to embodiments of the present disclosure.

FIG. 15 illustrates a flowchart for an example of PDSCH reception, where one or more bits in MCS field can be reinterpreted for indication of HARQ process number according to embodiments of the present disclosure. The method 1500 depicted in FIG. 15 is for illustration only. Other embodiments could be used without departing from the scope of this disclosure.

At operation 1501, a UE receives the configuration information, which can include the configuration of supported MCSs and/or the number of HARQ processes for the PDSCH. At operation 1502, the UE receives a PDCCH conveying a DCI that schedules a PDSCH. At operation 1503, the UE checks whether the maximum MCS index configured is smaller than M, where M is a predefined number, e.g., 8 or 16. The UE also checks whether the number of HARQ processes configured for the PDSCH is larger than L, where L is a predefined number, e.g., 16. If the configured maximum MCS index is smaller than M and the configured number of HARQ processes is larger than L, the UE receives the PDSCH based on the configuration and DCI indication at operation 1504, where UE interprets N−K bits (e.g., the N−K MSBs) in the MCS field of the DCI for the indication of the MCS index, and one or more bits out of the remaining K bits (e.g., the K LSBs) in the MCS field for the indication of the HARQ process number, where N and K can be any integers, e.g., N can be 5 and K can be 1 or 2. For example, the existing HARQ process number field in the DCI indicates the MSBs of the HARQ process number, while the K LSBs in the MCS field can be re-interpreted as the LSBs of the HARQ process number indication. If the configured maximum MCS index is not smaller than M or the configured number of HARQ processes is less than or equal to L, the UE receives the PDSCH based on the configuration and DCI indication at operation 1505, where UE interprets N bits in the MCS field of the DCI for the indication of the MCS index, where N can be any integers such as 5. This example can be applied to dynamically scheduled PDSCHs.

Figure 16:
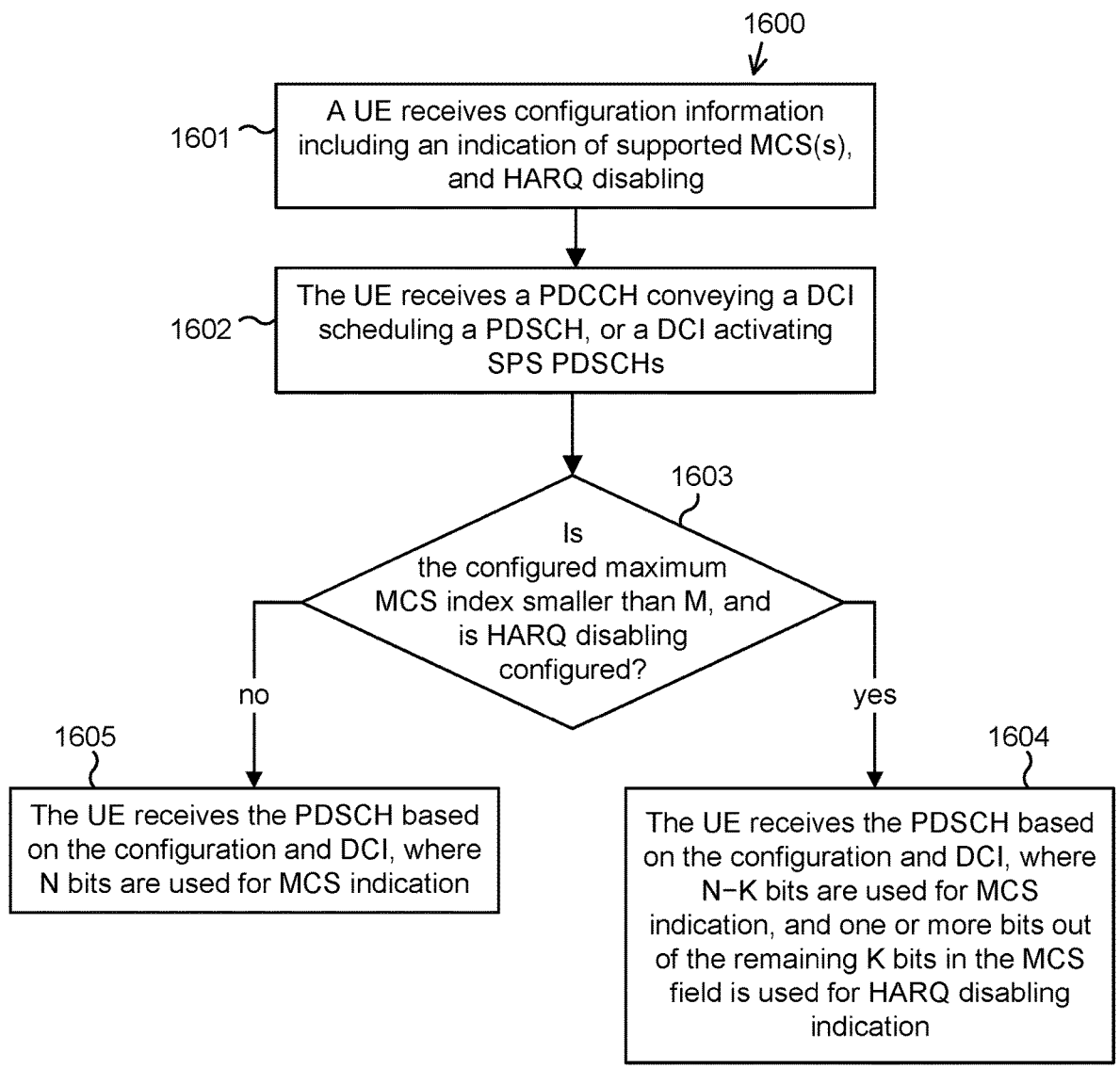
FIG. 16 illustrates a flowchart for an example of PDSCH reception, where one or more bits in MCS field can be reinterpreted for indication of HARQ disabling according to embodiments of the present disclosure.

FIG. 16 illustrates a flowchart for an example of PDSCH reception, where one or more bits in MCS field can be reinterpreted for indication of HARQ disabling according to embodiments of the present disclosure. The method 1600 depicted in FIG. 16 is for illustration only. Other embodiments could be used without departing from the scope of this disclosure.

At operation 1601, a UE receives the configuration information, which can include the configuration of supported MCSs and/or HARQ disabling. The HARQ-ACK feedback disabling can be configured, e.g., by the SIB1, or other system information, or UE-specific RRC signaling. In one example, HARQ disabling refers to the disabling of HARQ-ACK feedback for the PDSCH. When HARQ is enabled, the UE is not expected to receive another (distinct) PDSCH for a given HARQ process until after the end of the expected transmission of HARQ acknowledge (HARQ-ACK) for that HARQ process (e.g., as described in [38.214]). When HARQ is disabled, the UE may receive another PDSCH (distinct from a prior PDSCH) for a given HARQ process without the need to wait after the end of the transmission of HARQ-ACK feedback for that HARQ process. In one example, UE can skip the transmission of HARQ-ACK feedback for that HARQ process if HARQ is disabled. At operation 1602, the UE receives the PDCCH conveying the DCI, which schedules the PDSCH or activates an SPS PDSCH. At operation 1603, the UE checks whether the maximum MCS index configured is smaller than M, where M is a predefined number, e.g., 8 or 16. The UE also checks whether HARQ disabling is configured. If the configured maximum MCS index is smaller than M and HARQ disabling is configured, the UE receives the PDSCH based on the configuration and DCI indication at operation 1604, where the UE interprets N−K bits (e.g., the N−K MSBs) in the MCS field of the DCI for the indication of the MCS index, and one or more bits out of the remaining K bits (e.g., the K LSBs) in the MCS field for the indication of HARQ disabling, where N and K can be any integers, e.g., N can be 5 and K can be 1 or 2. For example, K can be 1, and when this 1 bit is 0, HARQ is disabled, and when this 1 bit is 1, HARQ is not disabled (is enabled), or vice versa. If the configured maximum MCS index is not smaller than M or HARQ disabling is not configured, the UE receives the PDSCH based on the configuration and DCI indication at operation 1605, where the UE interprets N bits in the MCS field of the DCI for the indication of MCS index, where N can be any integers such as 5. This can be applied to dynamically scheduled PDSCHs, e.g., with the DCI for PDSCH scheduling, and/or SPS PDSCHs, e.g., with the DCI for SPS PDSCH activation. For the SPS PDSCH case, the disabling/enabling of HARQ can be applied to all the SPS PDSCHs activated by the activation DCI.

Figure 17:
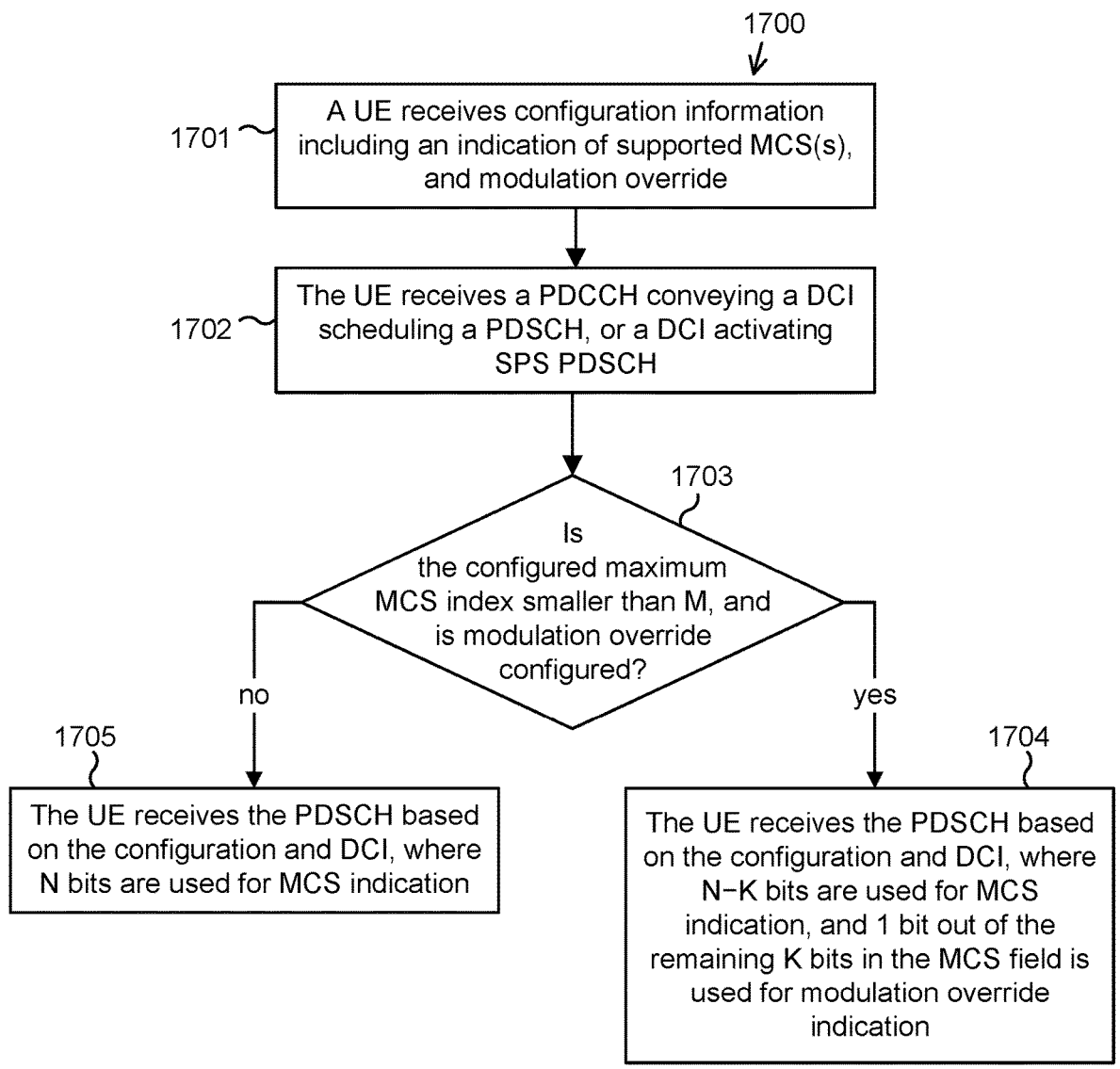
FIG. 17 illustrates a flowchart for an example of PDSCH reception, where one or more bits in MCS field can be reinterpreted for indication of modulation override according to embodiments of the present disclosure.

FIG. 17 illustrates a flowchart for an example of PDSCH reception, where one or more bits in MCS field can be reinterpreted for indication of modulation override according to embodiments of the present disclosure. The method 1700 depicted in FIG. 17 is for illustration only. Other embodiments could be used without departing from the scope of this disclosure.

At operation 1701, a UE receives the configuration information, which can include the configuration of supported MCSs and/or modulation override. The modulation override can be configured, e.g., by the SIB1, or other system information, or UE-specific RRC signaling. At operation 1702, the UE receives a PDCCH conveying a DCI, which schedules a PDSCH or activates an SPS PDSCH. At operation 1703, the UE checks whether the maximum MCS index configured is smaller than M, where M is a predefined number, e.g., 8 or 16. The UE also checks whether the modulation override is configured. If the configured maximum MCS index is smaller than M and modulation override is configured, the UE receives the PDSCH based on the configuration and DCI indication at operation 1704, where the UE interprets N−K bits (e.g., the N−K MSBs) in the MCS field of the DCI for indication of the MCS index, and one or more bits out of the remaining K bits (e.g., the K LSBs) in the MCS field for indication of modulation override, where N and K can be any integers, e.g., N can be 5 and K can be 1 or 2. For example, K can be 1, and when this 1 bit is 0, modulation override is disabled, and when this 1 bit is 1, modulation override is enabled, or vice versa. If the configured maximum MCS index is not smaller than M or modulation override is not configured, the UE receives the PDSCH based on the configuration and DCI indication at operation 1705, where UE interprets N bits in the MCS field of the DCI for the indication of the MCS index, where N can be any integer such as 5. This can be applied to dynamically scheduled PDSCHs, e.g., with the DCI for PDSCH scheduling, and/or SPS PDSCHs, e.g., with the DCI for SPS PDSCH activation. For the SPS PDSCH case, the disabling/enabling of modulation override can be applied to all SPS PDSCHs activated by the activation DCI.

Figure 18:
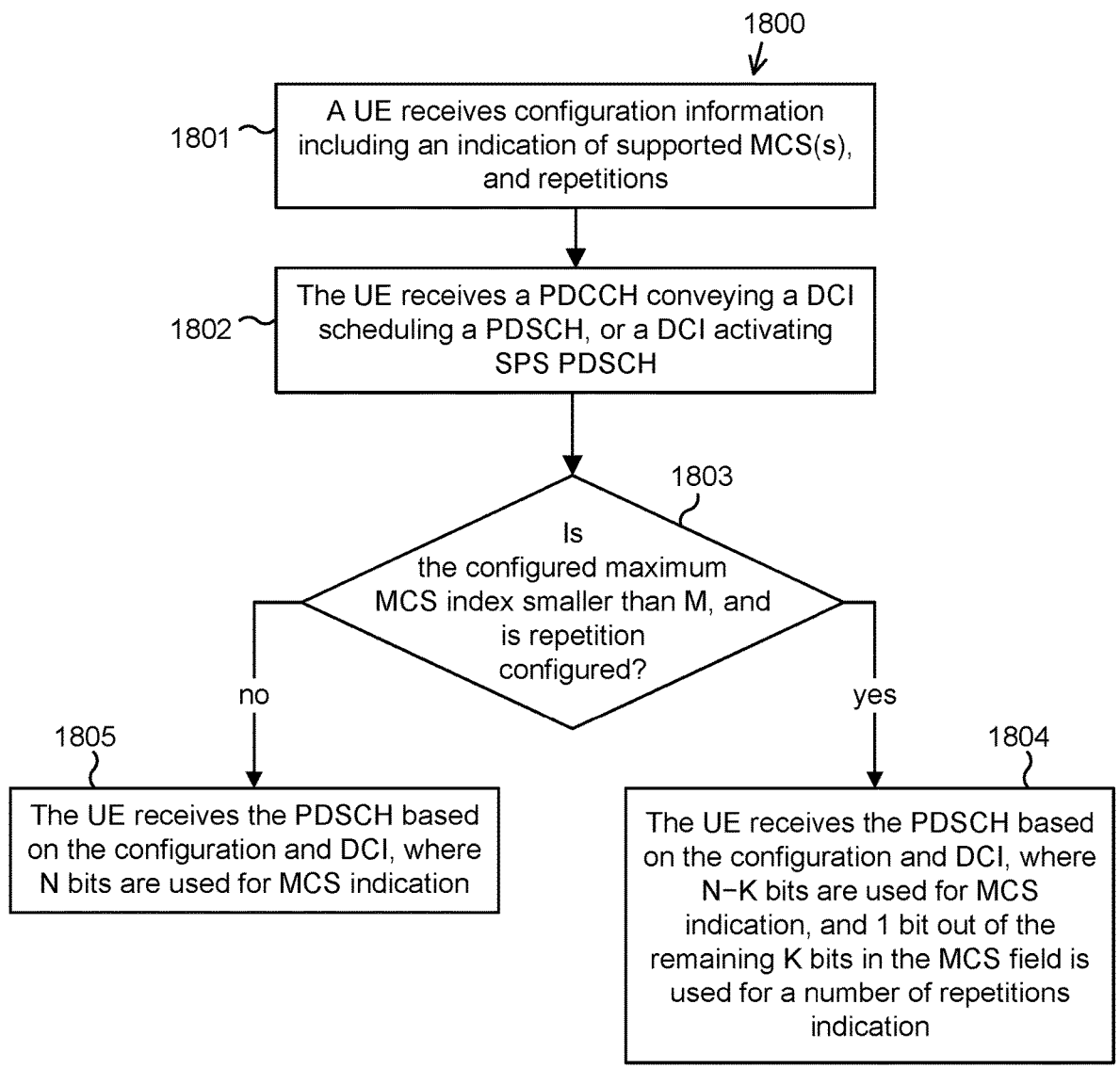
FIG. 18 illustrates a flowchart for an example of PDSCH reception, where one or more bits in MCS field can be reinterpreted for indication of a number of repetitions according to embodiments of the present disclosure.

FIG. 18 illustrates a flowchart for an example of PDSCH reception, where one or more bits in MCS field can be reinterpreted for indication of a number of repetitions according to embodiments of the present disclosure. The method 1800 depicted in FIG. 18 is for illustration only. Other embodiments could be used without departing from the scope of this disclosure.

At operation 1801, a UE receives the configuration information, which can include the configuration of supported MCS and/or repetitions. The repetitions of the PDSCH and/or the PDCCH can be configured, e.g., by the SIB1, or other system information, or UE-specific RRC signaling. At operation 1802, the UE receives a PDCCH conveying a DCI, which schedules a PDSCH or activates an SPS PDSCH. At operation 1803, the UE checks whether the maximum MCS index configured is smaller than M, where M is a predefined number, e.g., 8 or 16. The UE also checks whether repetition is configured. If the configured maximum MCS index is smaller than M and repetition is configured, the UE receives the PDSCH based on the configuration and DCI indication at operation 1804, where the UE interprets N−K bits (e.g., the N−K MSBs) in the MCS field of the DCI for the indication of the MCS index, and one or more bits out of the remaining K bits (e.g., the K LSBs) in the MCS field for the indication of a number of repetitions for the PDCCH and/or the PDSCH, where N and K can be any integers, e.g., N can be 5 and K can be 1 or 2. For example, one or more sets of numbers of repetitions can be configured by RRC signaling, with each set containing X number of repetitions, e.g., X=2 for {Nrep1, Nrep2}, where Nrep1 and Nrep2 can be any integers such as 1, 2, 4, 8, 16, . . . , 1024. K can be $\log_2$ X to indicate which one in the configured sets of numbers of repetitions should be used for the PDCCH or the PDSCH, e.g., K=1 for X=2 with 0 indicating Nrep1 and 1 indicating Nrep2. If the configured maximum MCS index is not smaller than M or repetition is not configured, the UE receives the PDSCH based on the configuration and DCI indication at operation 1805, where the UE interprets N bits in the MCS field of the DCI for the indication of the MCS index, where N can be any integer such as 5. This can be applied to dynamically scheduled PDSCHs, e.g., with the DCI for PDSCH scheduling, and/or SPS PDSCHs, e.g., with the DCI for SPS PDSCH activation. For the SPS PDSCH case, the number of repetitions can be applied to all SPS PDSCHs activated by the activation DCI.

Re-Interpretation of Certain Bits in the Resource Allocation Field in DCI for Other Indication for PDSCH In embodiments where the number of PRBs that can be allocated for the PDSCH is limited, one or more bits in the frequency domain resource assignment can be reinterpreted for other indications. For example, the configured BWP size can still be large for scheduling flexibility, and the number of PRBs that can be allocated for the PDSCH can be limited, e.g., to 1 or 2 PRBs.

In one example, when the number of HARQ processes is configured to be larger than a predefined value (e.g., 16), Y bits (e.g., the Y LSBs) in the frequency domain resource assignment field in the DCI can be re-interpreted for indication of the HARQ process number, where Y can be any integer (e.g., Y can be 1 or 2). This example can be applied to dynamically scheduled PDSCHs.

In another example, when HARQ disabling is configured, Y bits (e.g., the Y LSBs) in the frequency domain resource assignment field in the DCI can be re-interpreted for indication of HARQ disabling. Y can be any integers, e.g., Y=1 with the 1 bit being 0 for HARQ disabling and the 1 bit being 1 for HARQ enabling, or vice versa. This can be applied to dynamically scheduled PDSCHs, e.g., with the DCI for PDSCH scheduling, and/or SPS PDSCHs, e.g., with the DCI for SPS PDSCH activation. For the SPS PDSCH case, HARQ enabling/disabling can be applied to all SPS PDSCHs activated by the activation DCI.

In yet another example, when modulation override is configured, Y bits (e.g., the Y LSBs) in the frequency domain resource assignment field in the DCI can be re-interpreted for indication of modulation override. Y can be any integer, e.g., Y=1 with the 1 bit being 0 for disabling of modulation override and the 1 bit being 1 for enabling of modulation override, or vice versa. This can be applied to dynamically scheduled PDSCHs, e.g., with the DCI for PDSCH scheduling, and/or SPS PDSCHs, e.g., with the DCI for SPS PDSCH activation. For the SPS PDSCH case, modulation override enabling/disabling can be applied to all SPS PDSCHs activated by the activation DCI.

In some other examples, when repetition for the PDCCH and/or the PDSCH is configured, Y bits (e.g., the Y LSBs) in the frequency domain resource assignment field in the DCI can be re-interpreted for indication of the number of repetitions. For example, one or more sets of numbers of repetitions can be configured by RRC signaling (e.g., the MIB, SIB1 or other SIBS, or UE-specific RRC signaling), with each set contains X numbers of repetitions, e.g., X=2 for {Nrep1, Nrep2}, where Nrep1 and Nrep2 can be any integer such as 1, 2, 4, 8, 16, . . . , 1024. Y can be $\log_2$ X to indicate which one in the configured set of numbers of repetitions should be used for the PDCCH or the PDSCH, e.g., Y=1 for X=2 with 0 indicating Nrep1 and 1 indicating Nrep2. This can be applied to dynamically scheduled PDSCHs, e.g., with the DCI for PDSCH scheduling, and/or SPS PDSCHs, e.g., with the DCI for SPS PDSCH activation. For the SPS PDSCH case, the number of repetitions can be applied to all SPS PDSCHs activated by the activation DCI.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A base station, comprising:
   a transceiver configured to:
   transmit configuration information indicating one of a maximum transmission block size (TBS) or a maximum modulation and coding scheme (MCS) for one of a physical uplink shared channel (PUSCH) transmission or a physical downlink shared channel (PDSCH) reception, wherein the maximum TBS or the maximum MCS is configured based on a mapping between the maximum TBS or the maximum MCS and one of a plurality of defined non-terrestrial network (NTN) modes, the NTN modes each corresponding to a distance between the base station and a terminal, and
   transmit a signal indicating whether the PUSCH transmission or PDSCH reception uses a default MCS or an MCS that is determined based on at least the configured maximum MCS,
   wherein the PUSCH is received or the PDSCH is transmitted based on the signal.

2. The base station of claim 1, wherein the configured maximum TBS is determined based on a configured maximum number of frequency domain resources.

3. The base station of claim 2, wherein the configured maximum number of frequency domain resources is indicated by a master information block (MIB) or a system information block 1 (SIB1).

4. The base station of claim 1, wherein the configured maximum TBS is determined based on a configured number of hybrid automatic repeat request (HARQ) processes.

5. The base station of claim 4, wherein the number of hybrid automatic repeat request (HARQ) processes is determined based on $$\frac{N \times T_c}{L},$$

where N is a predefined value, $T_c$ is a predefined maximum TBS, and L is the configured number of HARQ processes.

6. The base station of claim 4, wherein the configured number of HARQ processes based on $$\frac{N \times T_c}{T_m},$$

where N is a predefined value, $T_c$ is a predefined maximum TBS, and $T_m$ is the configured maximum TBS.

7. The base station of claim 1, wherein the configured maximum MCS is overridden to a predefined modulation scheme based on a system mode.

8. A method, comprising:
transmitting configuration information indicating one of a maximum transmission block size (TBS) or a maximum modulation and coding scheme (MCS) for one of a physical uplink shared channel (PUSCH) transmission or a physical downlink shared channel (PDSCH) reception, wherein the maximum TBS or the maximum MCS is configured based on a mapping between the maximum TBS or the maximum MCS and one of a plurality of defined non-terrestrial network (NTN) modes, the NTN modes each corresponding to a distance between a base station and a terminal, and transmitting a signal indicating whether the PUSCH transmission or PDSCH reception uses a default MCS or an MCS that is determined based on at least the configured maximum MCS, wherein the PUSCH is received or the PDSCH is transmitted based on the signal.

9. The method of claim 8, wherein the configured maximum TBS based on a configured maximum number of frequency domain resources.

10. The method of claim 9, wherein the configured maximum number of frequency domain resources is indicated by a master information block (MIB) or a system information block 1 (SIB1).

11. The method of claim 8, wherein the configured maximum TBS is determined based on a configured number of hybrid automatic repeat request (HARQ) processes.

12. The method of claim 11, wherein the number of hybrid automatic repeat request (HARQ) processes is determined based on $$\frac{N \times T_c}{L},$$

where N is a predefined value, $T_c$ is a predefined maximum TBS, and L is the configured number of HARQ processes.

13. The method of claim 11, wherein the configured number of HARQ processes based on $$\frac{N \times T_c}{T_m},$$

where N is a predefined value, $T_c$ is a predefined maximum TBS, and $T_m$ is the configured maximum TBS.

14. The method of claim 8, wherein the configured maximum MCS is overridden to a predefined modulation scheme based on a system mode.

15. A terminal, comprising:
    a transceiver configured to:
    receive configuration information indicating one of a maximum transmission block size (TBS) or a maximum modulation and coding scheme (MCS) for one of a physical uplink shared channel (PUSCH) reception or a physical downlink shared channel (PDSCH) transmission wherein the maximum TBS or the maximum MCS is configured based on a mapping between the maximum TBS or the maximum MCS and one of a plurality of defined non-terrestrial network (NTN) modes, the NTN modes each corresponding to a distance between a base station and the terminal, receive a signal indicating whether the PUSCH reception or PDSCH transmission uses a default MCS or an MCS that is determined based on at least the configured maximum MCS, and transmit the PUSCH or receive the PDSCH based on the signal.

16. The terminal of claim 15, wherein the configured maximum TBS is determined based on a configured maximum number of frequency domain resources.

17. The terminal of claim 16, wherein the configured maximum number of frequency domain resources is indicated by a master information block (MIB) or a system information block 1 (SIB1).

18. The terminal of claim 15, wherein the configured maximum TBS is determined based on a configured number of hybrid automatic repeat request (HARQ) processes.

19. The terminal of claim 18, wherein the number of hybrid automatic repeat request (HARQ) processes is determined based on $$\frac{N \times T_c}{L},$$

where N is a predefined value, $T_c$ is a predefined maximum TBS, and L is the configured number of HARQ processes.

20. The terminal of claim 18, wherein the configured number of HARQ processes based on $$\frac{N \times T_c}{T_m},$$

where N is a predefined value, $T_c$ is a predefined maximum TBS, and $T_m$ is the configured maximum TBS.

* * * * *